United States Patent
Zhang

(10) Patent No.: US 12,069,249 B2
(45) Date of Patent: Aug. 20, 2024

(54) CODING MODE SELECTION METHOD AND APPARATUS, AND ELECTRONIC DEVICE AND COMPUTER-READABLE MEDIUM

(71) Applicant: TENCENT TECHNOLOGY (SHENZHEN) COMPANY LIMITED, Guangdong (CN)

(72) Inventor: Hong Shun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 317 days.

(21) Appl. No.: 17/687,924

(22) Filed: Mar. 7, 2022

(65) Prior Publication Data

US 2022/0191477 A1 Jun. 16, 2022

Related U.S. Application Data

(63) Continuation of application No. PCT/CN2020/126726, filed on Nov. 5, 2020.

(30) Foreign Application Priority Data

Feb. 17, 2020 (CN) .......................... 202010097112.9

(51) Int. Cl.
*H04N 19/107* (2014.01)
*H04N 19/119* (2014.01)
(Continued)

(52) U.S. Cl.
CPC ......... *H04N 19/107* (2014.11); *H04N 19/119* (2014.11); *H04N 19/147* (2014.11); *H04N 19/176* (2014.11)

(58) Field of Classification Search
CPC .. H04N 19/107; H04N 19/119; H04N 19/147; H04N 19/176
See application file for complete search history.

(56) References Cited

U.S. PATENT DOCUMENTS

| | | | |
|---|---|---|---|
| 2013/0188704 A1* | 7/2013 | Zhou | H04N 19/15 375/240.12 |
| 2017/0180738 A1* | 6/2017 | Park | H04N 19/103 |
| 2020/0053368 A1* | 2/2020 | Urban | H04N 19/159 |

FOREIGN PATENT DOCUMENTS

| | | | |
|---|---|---|---|
| CN | 104902271 A | * | 9/2015 |
| CN | 104902271 A | | 9/2015 |

(Continued)

OTHER PUBLICATIONS

Jarno Vanne et al., "Efficient Mode Decision Schemes for HEVC Inter Prediction", IEEE Transactions On Circuits and Systems for Video Technology, 2014, vol. 24, No. 9, pp. 1579-1593 (15 pages total).

(Continued)

*Primary Examiner* — Boubacar Abdou Tchoussou
(74) *Attorney, Agent, or Firm* — Sughrue Mion, PLLC

(57) ABSTRACT

A coding mode selection method is provided. The method includes acquiring a target frame image of a target video, determining a target coding unit based on the target frame image, the target coding unit comprising a prediction unit, obtaining rate-distortion costs of a symmetric inter prediction mode and a motion merge prediction mode by separately performing estimation on the prediction unit in the symmetric inter prediction mode and the motion merge prediction mode, determining a first candidate prediction mode based on the rate-distortion costs of the symmetric inter prediction mode and the motion merge prediction mode, and determining a second candidate prediction mode set in asymmetric inter prediction modes based on the first candidate prediction mode.

19 Claims, 11 Drawing Sheets

(51) Int. Cl.
*H04N 19/147* (2014.01)
*H04N 19/176* (2014.01)

(56) References Cited

FOREIGN PATENT DOCUMENTS

| | | | |
|---|---|---|---|
| CN | 105141954 A | 12/2015 | |
| CN | 105391999 A | 3/2016 | |
| CN | 107343198 A | 11/2017 | |
| CN | 111277838 A | 6/2020 | |
| WO | 2018/065567 A1 | 4/2018 | |
| WO | WO-2018117334 A1 * | 6/2018 | ............. H04N 19/11 |

OTHER PUBLICATIONS

International Search Report for PCT/CN2020/126726 dated Jan. 27, 2021 (PCT/ISA/210).
Written Opinion for PCT/CN2020/126726 dated Jan. 27, 2021 (PCT/ISA/237).

* cited by examiner

CODING MODE SELECTION METHOD AND APPARATUS, AND ELECTRONIC DEVICE AND COMPUTER-READABLE MEDIUM

CROSS-REFERENCE TO RELATED APPLICATION(S)

This Application is a continuation application of International Application No. PCT/CN2020/126726, filed on Nov. 5, 2020, which claims priority to Chinese Patent Application No. 202010097112.9, filed with the China National Intellectual Property Administration on Feb. 17, 2020, the entire contents of which are incorporated by reference herein.

FIELD

This disclosure relates generally to the field of natural language processing, and in particular, to a coding mode selection method and apparatus, an electronic device, and a computer-readable medium.

BACKGROUND

Videos tend to be with high definition, a high frame rate, and a high compression rate in the future. However, the popular compression mode now has certain limitations in principle and cannot meet future requirements. Therefore, various coding protocols suitable for video compression are developed. However, the coding protocols of the related technology are complex and require higher machine performance. When applied to ordinary machines, the coding speed is low, and real-time coding cannot be achieved. For example, the coding protocols of the related technology require traversal of each coding mode to determine an optimal coding mode among the coding modes based on results of the traversal. The complex traversal process leads to complex coding protocols of the related technology.

SUMMARY

Provided are a coding mode selection method and apparatus, an electronic device, and a computer-readable medium, which may improve a coding speed.

In accordance with an aspect of an example embodiment of the disclosure, a coding mode selection method, performed by at least one processor, may include acquiring a target frame image of a target video, determining a target coding unit based on the target frame image, the target coding unit comprising a prediction unit, obtaining rate-distortion costs of a symmetric inter prediction mode and a motion merge prediction mode by separately performing estimation on the prediction unit in the symmetric inter prediction mode and the motion merge prediction mode, determining a first candidate prediction mode based on the rate-distortion costs of the symmetric inter prediction mode and the motion merge prediction mode, determining a second candidate prediction mode set in asymmetric inter prediction modes based on the first candidate prediction mode, obtaining a rate-distortion cost of the second candidate prediction mode set by performing estimation on the prediction unit in a first candidate asymmetric inter prediction mode in the second candidate prediction mode set based on the second candidate prediction mode set being not empty, and determining a target prediction mode of the target coding unit based on the rate-distortion costs of the first candidate prediction mode and the second candidate prediction mode set.

In accordance with an aspect of the disclosure, an apparatus may include at least one memory configured to store computer program code and at least one processor configured to access said computer program code and operate as instructed by said computer program code, said computer program code including first acquiring code configured to cause the at least one processor to acquire a target frame image of a target video, first determining code configured to cause the at least one processor to determine a target coding unit based on the target frame image, the target coding unit comprising a prediction unit, first obtaining code configured to cause the at least one processor to obtain rate-distortion costs of a symmetric inter prediction mode and a motion merge prediction mode by separately performing estimation on the prediction unit in the symmetric inter prediction mode and the motion merge prediction mode, second determining code configured to cause the at least one processor to determine a first candidate prediction mode based on the rate-distortion costs of the symmetric inter prediction mode and the motion merge prediction mode, third determining code configured to cause the at least one processor to determine a second candidate prediction mode set in asymmetric inter prediction modes based on the first candidate prediction mode, second obtaining code configured to cause the at least one processor to obtain a rate-distortion cost of the second candidate prediction mode set by performing estimation on the prediction unit in a first candidate asymmetric inter prediction mode in the second candidate prediction mode set based on the second candidate prediction mode set being not empty, and fourth determining code configured to cause the at least one processor to determining a target prediction mode of the target coding unit based on the rate-distortion costs of the first candidate prediction mode and the second candidate prediction mode set.

In accordance with an aspect of an example embodiment of the disclosure, a non-transitory computer-readable storage medium may store computer instructions that, when executed by at least one processor of a device, cause the at least one processor to acquire a target frame image of a target video, determine a target coding unit based on the target frame image, the target coding unit comprising a prediction unit, obtain rate-distortion costs of a symmetric inter prediction mode and a motion merge prediction mode by separately performing estimation on the prediction unit in the symmetric inter prediction mode and the motion merge prediction mode, determine a first candidate prediction mode based on the rate-distortion costs of the symmetric inter prediction mode and the motion merge prediction mode, determine a second candidate prediction mode set in asymmetric inter prediction modes based on the first candidate prediction mode, obtain a rate-distortion cost of the second candidate prediction mode set by performing estimation on the prediction unit in a first candidate asymmetric inter prediction mode in the second candidate prediction mode set based on the second candidate prediction mode set being not empty, and determine a target prediction mode of the target coding unit based on the rate-distortion costs of the first candidate prediction mode and the second candidate prediction mode set.

An example embodiment of this disclosure provides a coding mode selection apparatus, including: a target image acquisition module, configured to acquire a target frame image of a target video; a coding unit acquisition module, configured to determine a target coding unit according to the target frame image, the target coding unit comprising a prediction unit; a first mode estimation module, configured to separately perform estimation on the prediction unit in a symmetric inter prediction mode and a motion merge prediction mode, to obtain rate-distortion costs of the symmetric inter prediction mode and the motion merge prediction mode; a candidate mode determining module, configured to determine a first candidate prediction mode according to the rate-distortion costs of the symmetric inter prediction mode and the motion merge prediction mode; an asymmetric mode determining module, configured to determine a second candidate prediction mode set in asymmetric inter prediction modes according to the first candidate prediction mode; a second mode estimation module, configured to perform estimation on the prediction unit in a candidate asymmetric inter prediction mode in the second candidate prediction mode set in a case that the second candidate prediction mode set is not empty, to obtain a rate-distortion cost of the second candidate prediction mode set; and a target mode determining module, configured to determine a target prediction mode of the target coding unit according to rate-distortion costs of the first candidate prediction mode and the second candidate prediction mode set.

An example embodiment of this disclosure provides an electronic device, including: one or more processors; and a memory, configured to store one or more programs, the one or more programs, when executed by the one or more processors, causing the one or more processors to implement the coding mode selection method described in the foregoing embodiment.

An example embodiment of this disclosure provides a computer-readable medium, storing a computer program, the program, when executed by a processor, implementing the coding mode selection method described in the foregoing embodiment.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1:
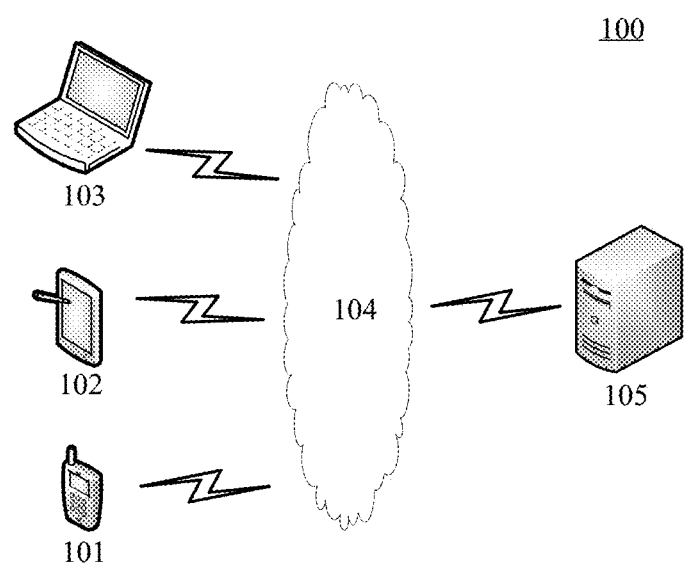
FIG. 1 is a diagram of a system architecture of a coding mode selection system according to an embodiment.

The examples of implementations are described comprehensively with reference to the accompanying drawings. However, the examples of implementations may be implemented in multiple forms, and it should not be understood as being limited to the examples of implementations described herein. Conversely, the implementations are provided to make this disclosure more comprehensive and complete, and comprehensively convey the idea of the examples of the implementations to a person skilled in the art.

In addition, the described features, structures, or properties may be combined in one or more embodiments in any appropriate manner. In the following descriptions, a lot of details are provided to give a comprehensive understanding of the embodiments of this disclosure. However, a person in the art should be aware that, the technical solutions in this disclosure may be implemented without one or more of the particular details, or another method, component, apparatus, or step may be used. In other cases, well-known methods, apparatuses, implementations, or operations are not shown or described in detail, in order not to obscure all aspects of this disclosure.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

According to the coding mode selection method and apparatus, the electronic device, and the computer-readable medium provided in the embodiments of this disclosure, a prediction unit of a target coding unit is used as an object to obtain rate-distortion costs of an estimation symmetric inter prediction mode and a motion merge prediction mode. In this way, a first candidate prediction mode may be determined according to rate-distortion costs of the symmetric inter prediction mode and the motion merge prediction mode, and then a second candidate prediction mode set may be determined in asymmetric inter prediction modes by using the first candidate prediction mode as a guide. In addition, estimation is performed on the prediction unit in a candidate asymmetric inter prediction mode in the second candidate prediction mode set when the second candidate prediction mode set is not empty, such that a target prediction mode of the target coding unit may be determined by using a rate-distortion cost of the obtained candidate asymmetric inter prediction mode and a rate-distortion cost of the first candidate prediction mode as a guide. In summary, during determining of the target prediction mode, division of the asymmetric inter prediction modes may be guided according to the first candidate prediction mode, to obtain the second candidate prediction mode set, and only the asymmetric inter prediction mode in the second candidate prediction mode set is estimated, such that an amount of calculation data may be effectively reduced, thereby increasing a coding speed and optimizing a coding process while ensuring quality.

FIG. 1 is a diagram of a system architecture of a coding mode selection system according to an embodiment. As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the quantity of terminal devices, the quantity of networks, and the quantity of servers in FIG. 1 are merely illustrative. There may be any quantity of terminal devices, any quantity of networks, and any quantity of servers according to an implementation requirement. For example, the server 105 may be a server cluster including a plurality of servers. During actual implementation, the server may include but is not limited to any hardware device capable of performing calculation, such as an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

A user may use the terminal devices 101, 102, and 103 to interact with the server 105 through the network 104 to receive or send messages, or the like. The terminal devices 101, 102, and 103 may be various electronic devices with a display screen and supporting web page browsing, including but not limited to smartphones, tablet computers, portable computers, desktop computers, wearable devices, virtual reality devices, smart homes, and the like.

The server 105 may be a server that provides various services. For example, the terminal device 103 (or the terminal device 101 or 102) uploads a target frame image to the server 105. The server 105 may acquire a target frame image of a target video, determine a target coding unit according to the target frame image, the target coding unit including a prediction unit, separately perform estimation on the prediction unit in a symmetric inter prediction mode and a motion merge prediction mode, to obtain rate-distortion costs of the symmetric inter prediction mode and the motion merge prediction mode, determine a first candidate prediction mode according to the rate-distortion costs of the symmetric inter prediction mode and the motion merge prediction mode, determine a second candidate prediction mode set in asymmetric inter prediction modes according to the first candidate prediction mode, perform estimation on the prediction unit in a candidate asymmetric inter prediction mode in the second candidate prediction mode set in a case that the second candidate prediction mode set is not empty, to obtain a rate-distortion cost of the second candidate prediction mode set, determine a target prediction mode of the target coding unit according to rate-distortion costs of the first candidate prediction mode and the second candidate prediction mode set, and feed back the target prediction mode to the terminal device 103, such that the terminal device 103 may predict a target prediction unit based on target prediction mode, thereby increasing a coding speed of the target video while ensuring coding quality.

Figure 2:
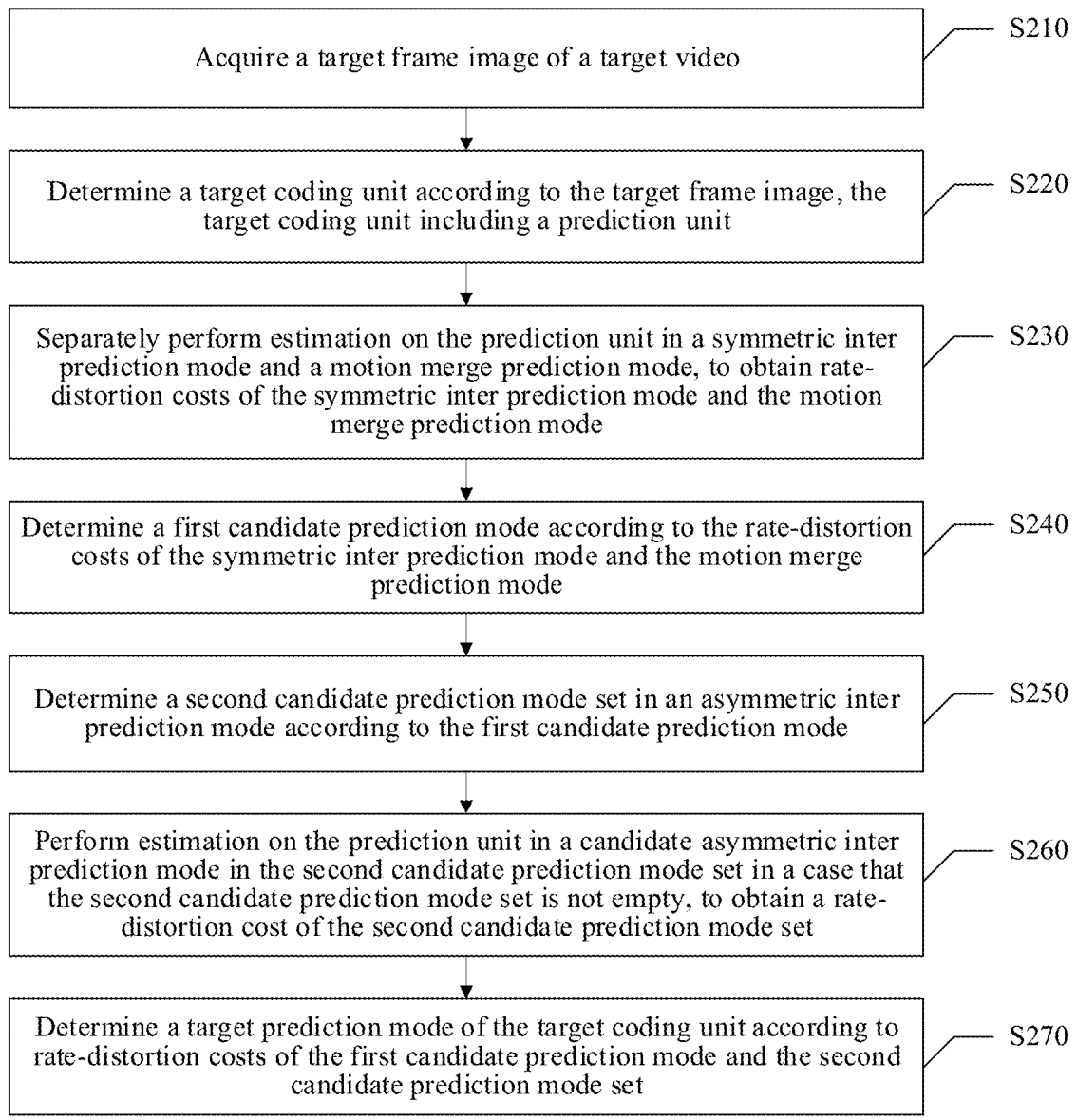
FIG. 2 is a flowchart of a coding mode selection method according to an embodiment.

FIG. 2 is a flowchart of a coding mode selection method according to an embodiment. The method provided in this embodiment of this disclosure may be processed by any electronic device with a calculation and processing capability, such as the server 105 and/or the terminal device 102 or 103 in the embodiment of FIG. 1. In the following embodiment, that the server 105 is used as an execution body is used as an example for description, but this disclosure is not limited thereto.

As shown in FIG. 2, the coding mode selection method provided in this embodiment of this disclosure may include the following operations.

In operation S210, the system acquires a target frame image of a target video.

In this embodiment of this disclosure, the target video may be any video to be compressed and submitted by a client, and the target frame image is a video frame image to be compressed in the target video.

In operation S220, the system determines a target coding unit according to the target frame image, the target coding unit including a prediction unit.

In this embodiment of this disclosure, the target coding unit is a current unit to be encoded among several coding units in the target frame image. The target frame image may be segmented into several coding tree units (CTUs), and a size of the CTU may usually be 64×64 pixels. Each CTU may be decomposed into several coding units (CUs) according to a quadtree structure. The prediction unit is a basic unit for performing a prediction operation in the target coding unit.

In operation S230, the system separately performs estimation on the prediction unit in a symmetric inter prediction mode and a motion merge prediction mode, to obtain rate-distortion costs of the symmetric inter prediction mode and the motion merge prediction mode, In this embodiment, the motion merge prediction mode (merge mode) is an inter prediction mode. In this mode, the concept of space-domain and time-domain motion vector prediction is used, to construct a candidate list and then find an index corresponding to an optimal result in the candidate list. This prediction mode does not need motion estimation. The motion merge prediction mode further includes a feature prediction mode: a skip prediction mode (skip mode). The skip prediction mode does not require residual calculation and merges index information of candidates according to the coding motion, to ensure that a prediction unit performing prediction in this mode during decoding may copy motion parameters of a selected candidate as motion parameters of the prediction unit. The skip prediction mode requires only a small quantity of bits to complete the prediction operation when coding in a region with little inter-frame change or in a static region without motion.

In this embodiment, the symmetric inter prediction mode includes inter-frame 2N×2N, inter-frame 2N×N, inter-frame N×2N prediction modes. For division of the prediction unit of the symmetric inter prediction modes, refer to schematic diagrams of (1), (3), and (4) in FIG. 15.

In operation S240, the system determines a first candidate prediction mode according to the rate-distortion costs of the symmetric inter prediction mode and the motion merge prediction mode.

In this embodiment, values of a rate-distortion cost of each symmetric inter prediction modes and a rate-distortion cost of the motion merge prediction mode may be compared, to use a prediction mode with a smallest rate-distortion cost among the prediction modes as the first candidate prediction mode.

In operation S250, the system determines a second candidate prediction mode set in asymmetric inter prediction modes according to the first candidate prediction mode.

In this embodiment, the first candidate prediction mode is used as a prediction mode with a smallest rate-distortion cost among each symmetric inter prediction mode and each motion merge prediction mode, and the first candidate prediction mode may be used as a guide to perform selection in the asymmetric inter prediction modes, to obtain the second candidate prediction mode set. The second candidate prediction mode set may include k candidate asymmetric inter prediction modes, k is an integer greater than or equal to 0, and a maximum value of k is a total quantity of types of asymmetric inter prediction modes.

In this embodiment, the asymmetric inter prediction mode may include inter-frame 2N×nU, inter-frame 2N×nD, inter-frame nL×2N, and inter-frame nR×2N prediction modes. 2N×nU and 2N×nD are respectively divided with ratios of 1:3 and 3:1 for the upper and lower parts. nL×2N and nR×2N are respectively divided with ratios of 1:3 and 3:1 for the left and right parts. 0<k<4. For division of the prediction unit of the asymmetric inter prediction modes, refer to schematic diagrams of (5) to (8) in FIG. 15.

In operation S260, the system performs estimation on the prediction unit in a candidate asymmetric inter prediction mode in the second candidate prediction mode set in a case that the second candidate prediction mode set is not empty, to obtain a rate-distortion cost of the second candidate prediction mode set.

In this embodiment, estimation may be performed on the prediction unit in k candidate asymmetric inter prediction modes in the second candidate prediction mode set, to obtain rate-distortion costs of the k candidate asymmetric inter prediction modes, k being an integer greater than or equal to 1. In an exemplary embodiment, after estimation is performed on the prediction unit in a candidate asymmetric inter prediction mode in the second candidate prediction mode set, a smallest rate-distortion cost in the candidate asymmetric inter prediction mode may be used as the rate-distortion cost of the second candidate prediction mode set.

In operation S270, the system determines a target prediction mode of the target coding unit according to rate-distortion costs of the first candidate prediction mode and the second candidate prediction mode set.

In this embodiment, values of a rate-distortion cost of the first candidate prediction mode and a rate-distortion cost of the candidate asymmetric inter prediction mode may be compared, to use a prediction mode with a smallest rate-distortion cost among the foregoing prediction modes as the target prediction mode of the target coding unit.

In this operation, the comparison of the values of rate-distortion costs may also include a value of a rate-distortion cost of an intra prediction mode. For division of a prediction unit of the intra prediction mode, refer to a schematic diagram of (2) in FIG. 15.

According to the coding mode selection method provided in this implementation of this disclosure, a prediction unit of a target coding unit is used as an object to obtain rate-distortion costs of an estimation symmetric inter prediction mode and a motion merge prediction mode. In this way, a first candidate prediction mode may be determined according to rate-distortion costs of the symmetric inter prediction mode and the motion merge prediction mode, and then a second candidate prediction mode set may be determined in asymmetric inter prediction modes by using the first candidate prediction mode as a guide. In addition, estimation is performed on the prediction unit in a candidate asymmetric inter prediction mode in the second candidate prediction mode set when the second candidate prediction mode set is not empty, such that a target prediction mode of the target coding unit may be determined by using a rate-distortion cost of the obtained candidate asymmetric inter prediction mode and a rate-distortion cost of the first candidate prediction mode as a guide. In summary, during determining of the target prediction mode, division of the asymmetric inter prediction modes may be guided according to the first candidate prediction mode, to obtain the second candidate prediction mode set, and only the asymmetric inter prediction mode in the second candidate prediction mode set is estimated, such that an amount of calculation data may be effectively reduced, thereby increasing a coding speed and optimizing a coding process while ensuring quality.

Figures 3, 4:
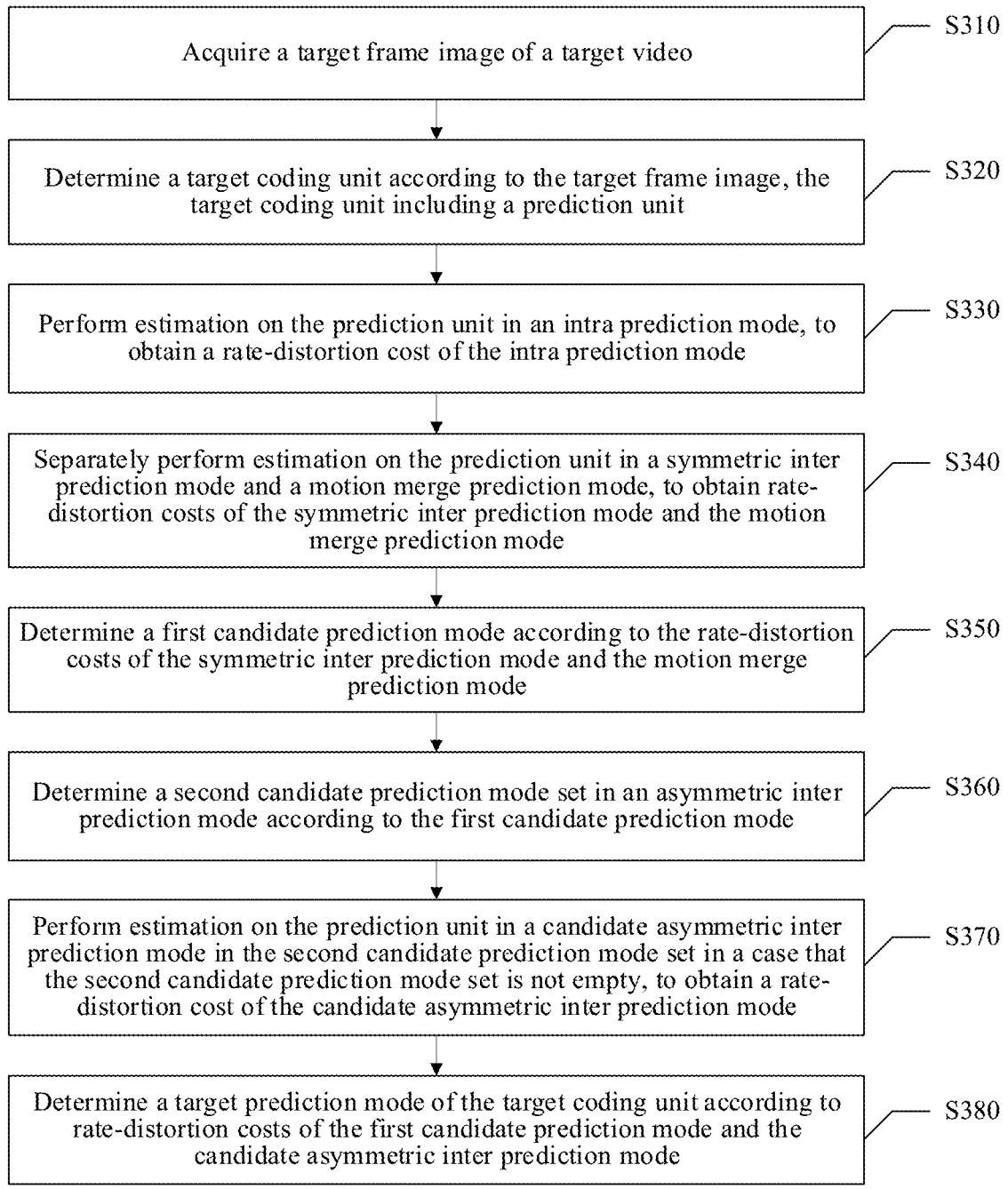
FIG. 3 is a flowchart of a coding mode selection method according to an embodiment.
FIG. 4 is a flowchart of operation S350 of FIG. 3 according to an embodiment.

FIG. 3 is a flowchart of a coding mode selection method according to an embodiment. As shown in FIG. 3, the coding mode selection method in this embodiment may include the following operations.

In operation S310, the system acquires a target frame image of a target video.

In operation S320, the system determines a target coding unit according to the target frame image, the target coding unit including a prediction unit.

In operation S330, the system performs estimation on the prediction unit in an intra prediction mode, to obtain a rate-distortion cost of the intra prediction mode.

In this embodiment, an intra prediction mode is a mode in which the sameness of adjacent frames is not considered and only a single frame is used for prediction.

In operation S340, the system separately performs estimation on the prediction unit in a symmetric inter prediction mode and a motion merge prediction mode, to obtain rate-distortion costs of the symmetric inter prediction mode and the motion merge prediction mode.

In operation S350, the system determines a first candidate prediction mode according to the rate-distortion costs of the symmetric inter prediction mode and the motion merge prediction mode.

In this embodiment of this disclosure, the rate-distortion cost of the intra prediction mode may be further considered. The first candidate prediction mode is determined according to the rate-distortion costs of the intra prediction mode, the symmetric inter prediction mode, and the motion merge prediction mode.

In operation S360, the system determines a second candidate prediction mode set in asymmetric inter prediction modes according to the first candidate prediction mode.

In operation S370, the system performs estimation on the prediction unit in a candidate asymmetric inter prediction mode in the second candidate prediction mode set in a case that the second candidate prediction mode set is not empty, to obtain a rate-distortion cost of the second candidate prediction mode set.

In this embodiment, there may be one rate-distortion cost of the candidate asymmetric inter prediction mode, and a value of the rate-distortion cost may be a smallest value in the rate-distortion costs of the candidate asymmetric inter prediction modes in the second candidate prediction mode set.

In operation S380, the system determines a target prediction mode of the target coding unit according to rate-distortion costs of the first candidate prediction mode and the second candidate prediction mode set.

According to the coding mode selection method provided in this implementation of this disclosure, a prediction unit of a target coding unit is used as an object to obtain rate-distortion costs of an estimation intra prediction mode, a symmetric inter prediction mode, and a motion merge prediction mode. In this way, a first candidate prediction mode may be determined according to the rate-distortion costs of the intra prediction mode, the symmetric inter prediction mode, and the motion merge prediction mode, and then a second candidate prediction mode set may be determined in asymmetric inter prediction modes by using the first candidate prediction mode as a guide. In addition, estimation is performed on the prediction unit in a candidate asymmetric inter prediction mode in the second candidate prediction mode set when the second candidate prediction mode set is not empty, such that a target prediction mode of the target coding unit may be determined by using a rate-distortion cost of the obtained candidate asymmetric inter prediction mode and a rate-distortion cost of the first candidate prediction mode as a guide. In summary, during determining of the target prediction mode, division of the asymmetric inter prediction modes may be guided according to the first candidate prediction mode, to obtain the second candidate prediction mode set, and only the asymmetric inter prediction mode in the second candidate prediction mode set is estimated, such that an amount of calculation data may be effectively reduced, thereby increasing a coding speed and optimizing a coding process while ensuring quality.

FIG. 4 is a flowchart of operation S350 of FIG. 3 in an exemplary embodiment. As shown in FIG. 4, operation S350 in the embodiment of FIG. 3 may include the following steps.

In this embodiment, the symmetric inter prediction mode includes a first symmetric inter prediction mode, a second symmetric inter prediction mode, and a third symmetric inter prediction mode. The first symmetric inter prediction mode may be the 2N×N prediction unit division mode shown by (3) in FIG. 15. The second symmetric inter prediction mode may be the N×2N prediction unit division mode shown by (4) in FIG. 15. The third symmetric inter prediction mode may be the 2N×2N prediction unit division mode shown by (1) in FIG. 15.

In operation S351, the system uses, as the first candidate prediction mode, an object having a smallest rate-distortion cost among the intra prediction mode, the first symmetric inter prediction mode, the second symmetric inter prediction mode, and the third symmetric inter prediction mode.

In the technical solution of this embodiment of this disclosure, a prediction mode having a smallest rate-distortion cost among the first symmetric inter prediction mode, the second symmetric inter prediction mode, the third symmetric inter prediction mode, the motion merge prediction mode, and the intra prediction mode may be used as the first candidate prediction mode, to serve as a guiding factor during determining of the second candidate prediction mode set in subsequent steps (for example, in operation S360 to in operation S380).

Figure 5:
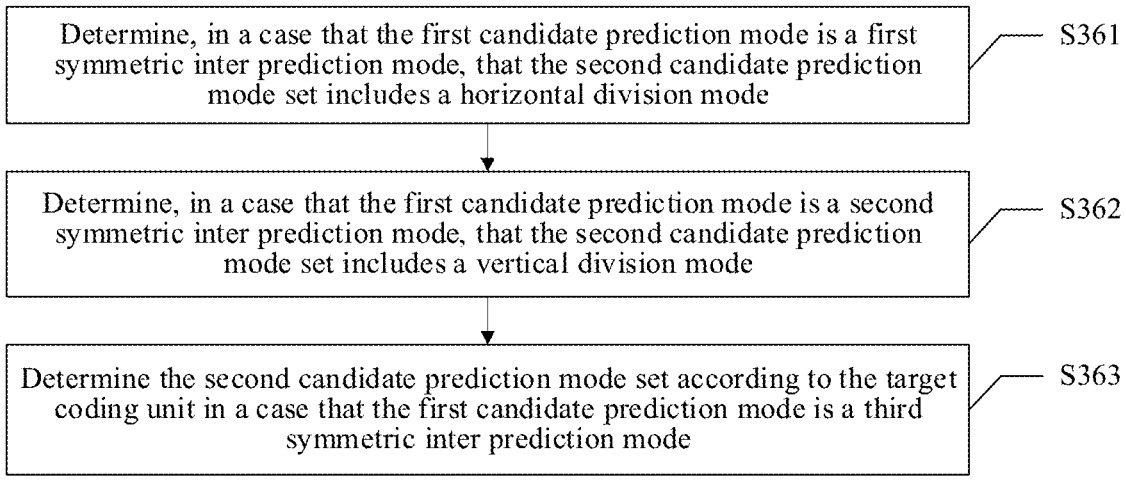
FIG. 5 is a flowchart of operation S360 of FIG. 3 according to an embodiment.

FIG. 5 is a flowchart of operation S360 of FIG. 3 according to an embodiment. As shown in FIG. 5, operation S360 in the embodiment of FIG. 3 may include the following operations. In this embodiment, the asymmetric inter prediction modes include a horizontal division mode and a vertical division mode. The horizontal division mode may be, for example, prediction unit division modes shown by (5) and (6) in FIG. 15. The vertical division mode may be, for example, prediction unit division modes shown by (7) and (8) in FIG. 15.

In operation S361, the system determines, in a case that the first candidate prediction mode is a first symmetric inter prediction mode, that the second candidate prediction mode set includes a horizontal division mode.

Figure 15:
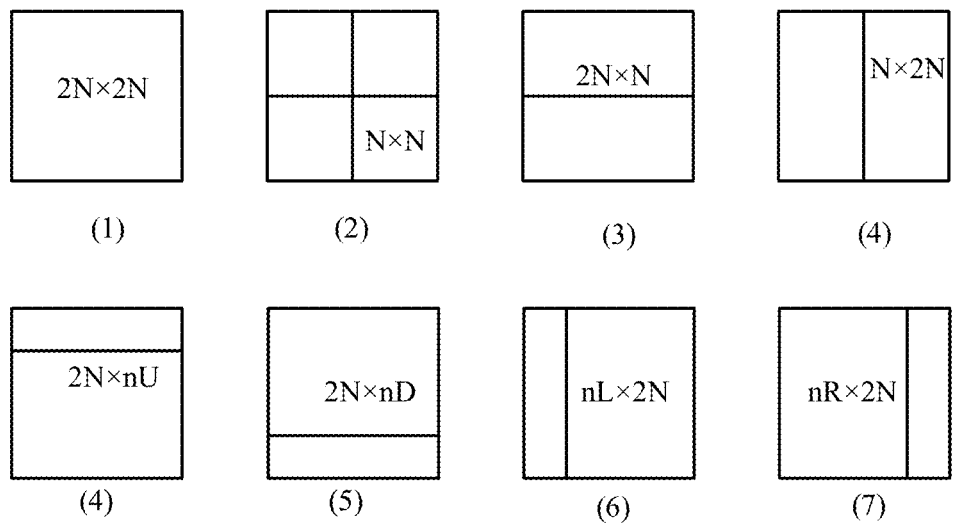
FIG. 15 is a diagram of a prediction unit according to an embodiment.

In this embodiment, the first symmetric inter prediction mode may be the 2N×N prediction unit division mode shown by (3) in FIG. 15. When the first candidate prediction mode is the first symmetric inter prediction mode, it indicates that the target coding unit is applicable to a form of horizontal division of the prediction unit with a high probability.

In operation S362, the system determines, in a case that the first candidate prediction mode is a second symmetric inter prediction mode, that the second candidate prediction mode set includes a vertical division mode.

In this embodiment, the second symmetric inter prediction mode may be the N×2N prediction unit division mode shown by (4) in FIG. 15. When the first candidate prediction mode is the second symmetric inter prediction mode, it indicates that the target coding unit is applicable to a form of vertical division of the prediction unit with a high probability.

In operation S363, the system determines the second candidate prediction mode set according to the target coding unit in a case that the first candidate prediction mode is a third symmetric inter prediction mode.

In this embodiment, the estimation of which asymmetric inter prediction mode needs to be performed on the target coding unit may be determined according to residual indicators of the several subblocks obtained through the division of the target coding unit.

In this embodiment, the first candidate prediction mode is used as a guide to select from the horizontal division mode and the vertical division mode, to determine the second candidate prediction mode set. In this way, a quantity of prediction modes to be estimated in the second candidate prediction mode set may be reduced, thereby reducing a computation amount of the estimation of the prediction modes and directly increasing a coding speed.

Figure 6:
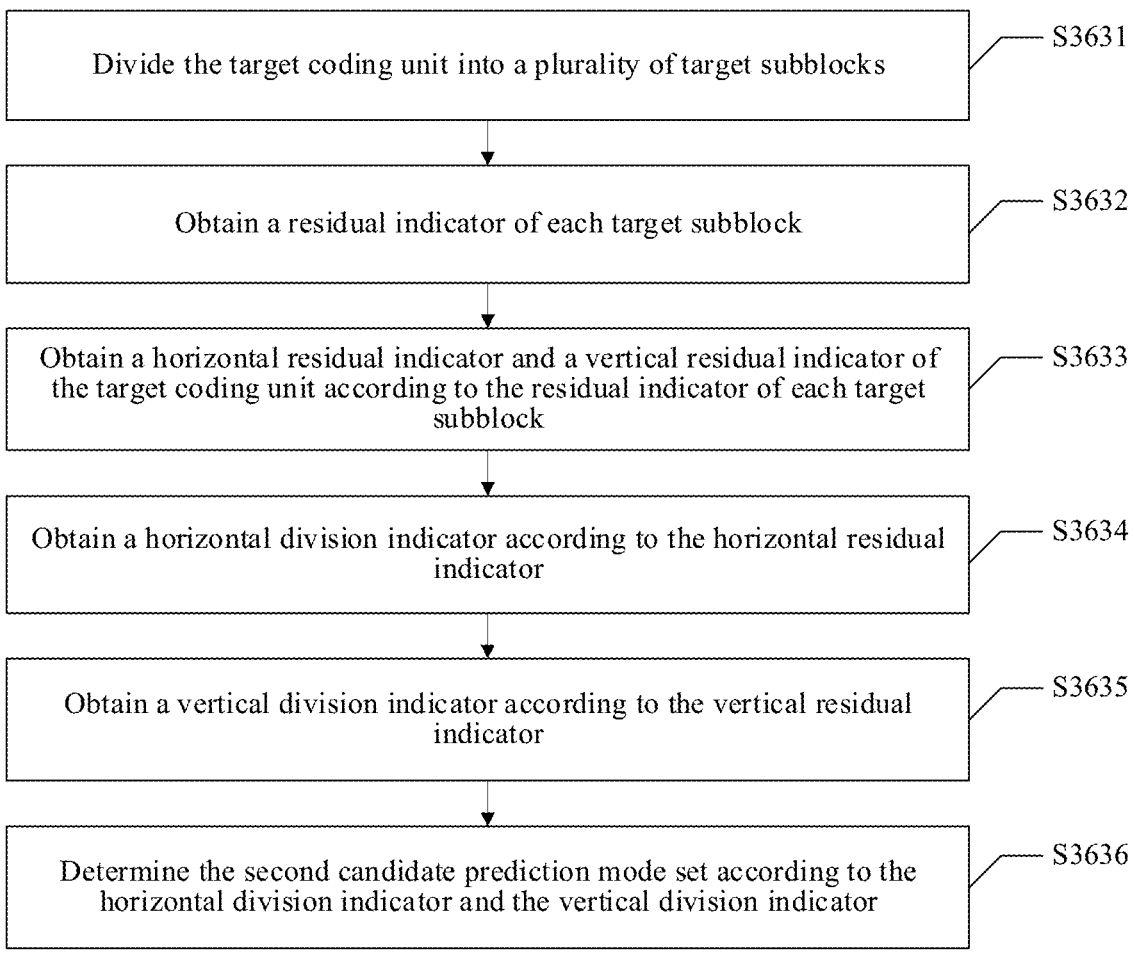
FIG. 6 is a flowchart of operation S363 of FIG. 5 according to an embodiment.

FIG. 6 is a flowchart of operation S363 of FIG. 5 according to an embodiment. As shown in FIG. 6, operation S363 in the embodiment of FIG. 5 may include the following operations.

In operation S3631, the system divides the target coding unit into a plurality of target subblocks.

Figure 19:
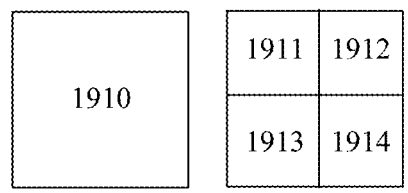
FIG. 19 is a diagram of a target subblock according to an embodiment.

In this embodiment, the target coding unit may be divided into a plurality of target subblocks according to a quadtree structure. The target coding unit may be divided once according to the quadtree structure, to obtain a first target subblock, a second target subblock, a third target subblock, and a fourth target subblock. FIG. 19 is a schematic diagram of a target subblock according to an embodiment of this disclosure. As shown in FIG. 19, a target coding unit 1910 may be divided into a first target subblock 1911, a second target subblock 1912, a third target subblock 1913, and a fourth target subblock 1914.

In operation S3632, the system obtains a residual indicator of each target subblock.

In this embodiment, the residual indicator may be any one of a sum of squared estimate of errors (SSE), a sum of absolute differences (SAD), and a sum of absolute transformed differences (SATD), or may be a residual indicator in another form. The form of the residual indicator is not specially limited in this embodiment of this disclosure.

As an example, the SSE reflects a discrete state of each observation of each sample, and may be calculated by using the Equation (1):

$$SSE = \Sum_{i=0}^{n}(x-x_i)^2 \quad (1)$$

where n is a quantity of pixels, $x_i$ is an $i^{th}$ pixel value, and x is a predicted pixel value.

In operation S3633, the system obtains a horizontal residual indicator and a vertical residual indicator of the target coding unit according to the residual indicator of the each target subblock.

In this embodiment, when a plurality of target subblocks are shaped as the first target subblock, the second target subblock, the third target subblock, and the fourth target subblock that are shown in FIG. 19, the horizontal residual indicator may be determined according to a sum of residual indicators of the first target subblock and the second target subblock and a sum of residual indicators of the third target subblock and the fourth target subblock. The vertical residual indicator is determined according to a sum of residual indicators of the first target subblock and the third target subblock and a sum of residual indicators of the second target subblock and the fourth target subblock.

If the residual indicator is the SSE, the residual indicators of the first target subblock, the second target subblock, the third target subblock, and the fourth target subblock may be denoted as SSE 1, SSE 2, SSE 3, and SSE 4, respectively. The horizontal residual indicators may be denoted as SSE1+SSE2 and SSE3+SSE4. The vertical residual indicators may be denoted as SSE1+SSE3 and SSE2+SSE4.

In operation S3634, the system obtains a horizontal division indicator according to the horizontal residual indicator.

In this embodiment, a ratio of SSE1+SSE2 to SSE3+SSE4 may be used as the horizontal division indicator. If SSE1+SSE2 is greater than or equal to SSE3+SSE4, it is determined that the horizontal division indicator ratio 1 is (SSE1+SSE2)/(SSE3+SSE4), otherwise, ratio 1 is (SSE3+SSE4)/(SSE1+SSE2). In this embodiment of this disclosure, after values of the horizontal residual indicators SSE1+SSE2 and SSE3+SSE4 are compared, calculation is performed by using a horizontal residual indicator with a larger value as a numerator and a horizontal residual indicator with a smaller value as a denominator, to obtain the horizontal division indicator. This may ensure that a value of the horizontal division indicator may reflect a probability value of the horizontal division prediction mode.

In operation S3635, the system obtains a vertical division indicator according to the vertical residual indicator.

In this embodiment, a ratio between SSE1+SSE3 and SSE2+SSE4 may be used as the vertical division indicator. If SSE1+SSE3 is greater than or equal to SSE2+SSE4, it is determined that the vertical division indicator ratio 2 is (SSE1+SSE3)/(SSE2+SSE4), otherwise, ratio 2 is (SSE2+SSE4)/(SSE1+SSE3). In this embodiment of this disclosure, after values of the vertical residual indicators SSE1+SSE3 and SSE2+SSE4 are compared, calculation is performed by using a vertical residual indicator with a larger value as a numerator and a vertical residual indicator with a smaller value as a denominator, to obtain the vertical division indicator. This may ensure that a value of the vertical division indicator may reflect a probability value of the vertical division prediction mode.

In operation S3636, the system determines the second candidate prediction mode set according to the horizontal division indicator and the vertical division indicator.

In this embodiment, values of the horizontal division indicator and the vertical division indicator may be compared to determine the second candidate prediction mode set according to a result of the comparison.

In this embodiment, the target coding unit is divided into a plurality of target subblocks when the first candidate prediction mode is the third symmetric inter prediction mode, such that the horizontal division indicator and the vertical division indicator may be obtained according to the residual indicators of the target subblocks. In this way, the horizontal division indicator and the vertical division indicator may be used as a guide to determine the second candidate prediction mode set. In this way, a quantity of prediction modes to be estimated in the second candidate prediction mode set may be reduced, thereby reducing a computation amount of the estimation of the prediction modes and directly increasing a coding speed.

Figure 7:
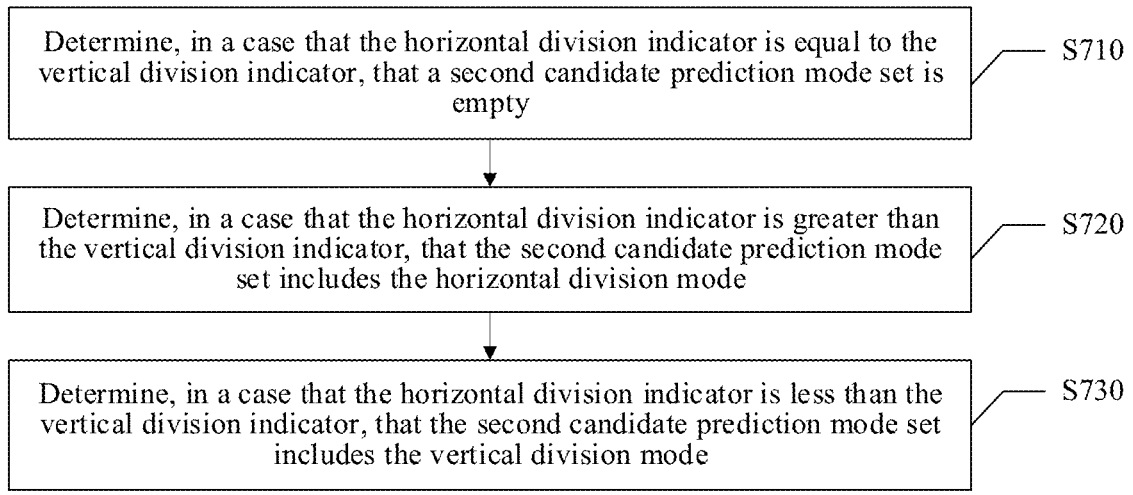
FIG. 7 is a flowchart of operation S3636 of FIG. 6 according to an embodiment.

FIG. 7 is a flowchart of operation S3636 of FIG. 6 according to an embodiment. As shown in FIG. 7, operation S3636 in the embodiment of FIG. 6 may include the following operations.

In operation S710, the system determines, in a case that the horizontal division indicator is equal to the vertical division indicator, that the second candidate prediction mode set is empty.

In operation S720, the system determines, in a case that the horizontal division indicator is greater than the vertical division indicator, that the second candidate prediction mode set includes the horizontal division mode.

In operation S730, the system determines, in a case that the horizontal division indicator is less than the vertical division indicator, that the second candidate prediction mode set includes the vertical division mode.

In this embodiment, the horizontal division indicator and the vertical division indicator may be used as a guide to select from the horizontal division mode and the vertical division mode, to determine the second candidate prediction mode set. In this way, a quantity of prediction modes to be estimated in the second candidate prediction mode set may be reduced, thereby reducing a computation amount of the estimation of the prediction modes and directly increasing a coding speed.

Figure 8:
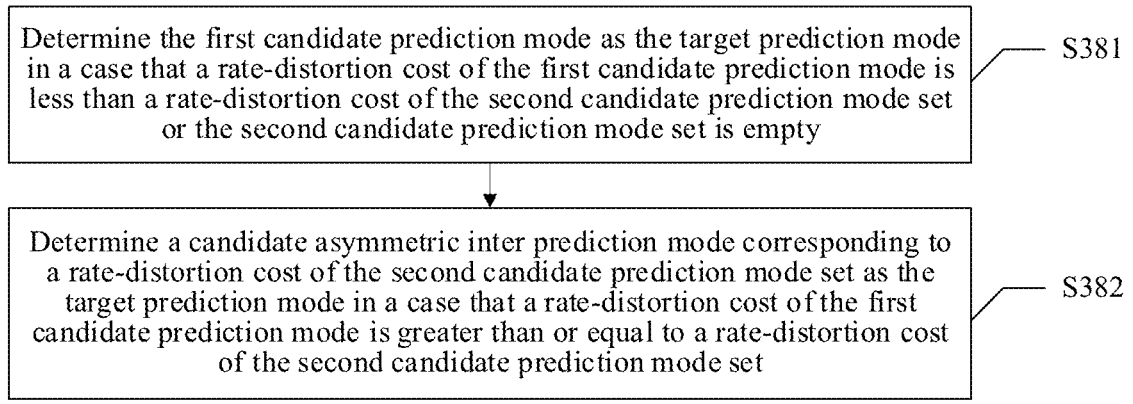
FIG. 8 is a flowchart of operation S380 of FIG. 3 according to an embodiment.

FIG. 8 is a flowchart of operation S380 of FIG. 3 according to an embodiment. As shown in FIG. 8, operation S380 in the embodiment of FIG. 3 may include the following operations.

In operation S381, the system determines the first candidate prediction mode as the target prediction mode in a case that a rate-distortion cost of the first candidate prediction mode is less than a rate-distortion cost of the second candidate prediction mode set or the second candidate prediction mode set is empty.

In this embodiment, the rate-distortion cost of the second candidate prediction mode set may be a smallest value of rate-distortion costs of all modes in the second candidate prediction mode set.

In operation S382, the system determines a candidate asymmetric inter prediction mode corresponding to a rate-distortion cost of the second candidate prediction mode set as the target prediction mode in a case that a rate-distortion cost of the first candidate prediction mode is greater than or equal to a rate-distortion cost of the second candidate prediction mode set.

Figure 9:
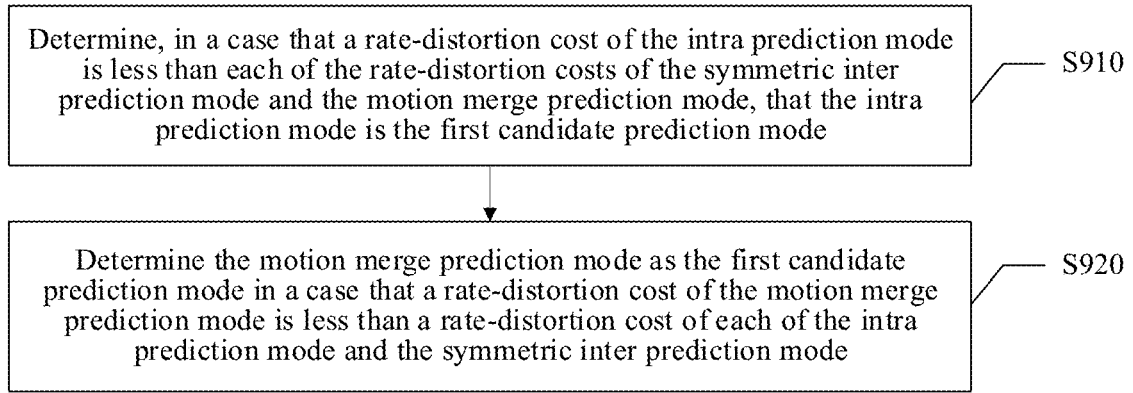
FIG. 9 is a flowchart of operation S350 of FIG. 3 according to an embodiment.

FIG. 9 is a flowchart of operation S350 of FIG. 3 according to an embodiment. As shown in FIG. 9, operation S350 in the embodiment of FIG. 3 may include the following operations.

In operation S910, the system determines, in a case that a rate-distortion cost of the intra prediction mode is less than each of the rate-distortion costs of the symmetric inter prediction mode and the motion merge prediction mode, that the intra prediction mode is the first candidate prediction mode.

In this embodiment, if the rate-distortion cost of the intra prediction mode is less than each of the rate-distortion costs of the symmetric inter prediction mode and the motion merge prediction mode, it may be further determined that the second candidate prediction mode set is empty, and that the intra prediction mode is the first candidate prediction mode.

In operation S920, the system determines the motion merge prediction mode as the first candidate prediction mode in a case that a rate-distortion cost of the motion merge prediction mode is less than a rate-distortion cost of each of the intra prediction mode and the symmetric inter prediction mode.

In this embodiment, if the rate-distortion cost of the motion merge prediction mode is less than the rate-distortion cost of each of the intra prediction mode and the symmetric inter prediction mode, it may be further determined that the second candidate prediction mode set is empty, and that the motion merge prediction mode is the first candidate prediction mode.

Figure 10:
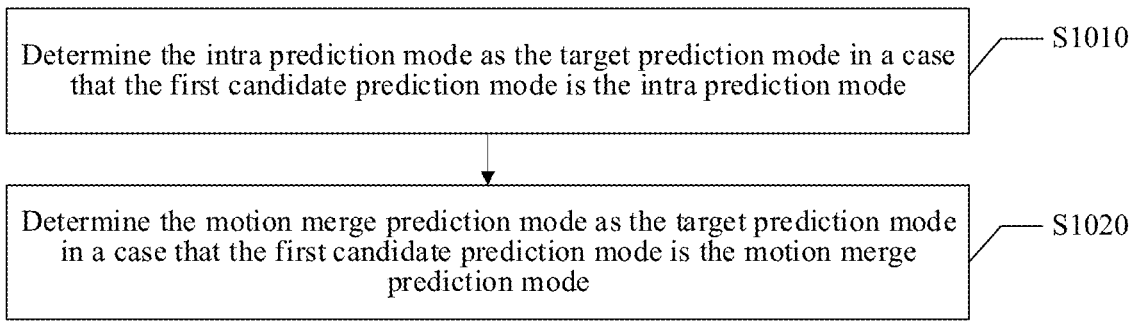
FIG. 10 is a flowchart of operation S350 of FIG. 3 according to an embodiment.

FIG. 10 is a flowchart of operation S350 of FIG. 3 according to an embodiment. As shown in FIG. 10, operation S350 in the embodiment of FIG. 3 may include the following steps.

In operation S1010, the system determines the intra prediction mode as the target prediction mode in a case that the first candidate prediction mode is the intra prediction mode.

In this embodiment, when the first candidate prediction mode is the intra prediction mode, it may be determined that the second candidate prediction mode set is empty, and that the intra prediction mode is the target prediction mode.

In operation S1020, the system determines the motion merge prediction mode as the target prediction mode in a case that the first candidate prediction mode is the motion merge prediction mode.

In this embodiment, when the first candidate prediction mode is the motion merge prediction mode, it may be determined that the second candidate prediction mode set is empty, and that the motion merge prediction mode is the target prediction mode.

In this embodiment, operation S1010 to operation S1020 may be performed based on the technical solution of the embodiment of FIG. 9.

In this embodiment of this disclosure, the target prediction mode may be directly determined when the first candidate prediction mode is the intra prediction mode or the motion merge prediction mode, such that estimation of the asymmetric inter prediction mode may be skipped, thereby helping reduce a computation amount of a prediction mode selection process and increase a coding speed.

Figure 11:
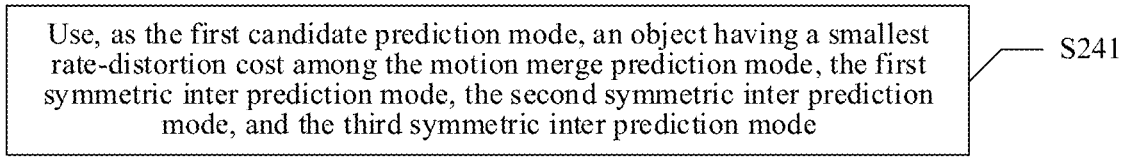
FIG. 11 is a flowchart of operation S240 of FIG. 2 according to an embodiment.

FIG. 11 is a flowchart of operation S240 of FIG. 2 according to an embodiment. As shown in FIG. 11, operation S240 in the embodiment of FIG. 2 may include the following steps.

In this embodiment, the symmetric inter prediction mode includes a first symmetric inter prediction mode, a second symmetric inter prediction mode, and a third symmetric inter prediction mode. The first symmetric inter prediction mode may be the 2N×N prediction unit division mode shown by (3) in FIG. 15. The second symmetric inter prediction mode may be the N×2N prediction unit division mode shown by (4) in FIG. 15. The third symmetric inter prediction mode may be the 2N×2N prediction unit division mode shown by (1) in FIG. 15.

In operation S241, the system uses, as the first candidate prediction mode, an object having a smallest rate-distortion cost among the motion merge prediction mode, the first symmetric inter prediction mode, the second symmetric inter prediction mode, and the third symmetric inter prediction mode.

In this embodiment of this disclosure, a prediction mode having a smallest rate-distortion cost among the motion merge prediction mode, the first symmetric inter prediction mode, the second symmetric inter prediction mode, and the third symmetric inter prediction mode may be used as the first candidate prediction mode, to serve as a guiding factor during determining of the second candidate prediction mode set in subsequent steps (for example, in operation S250 to in operation S270).

Figure 12:
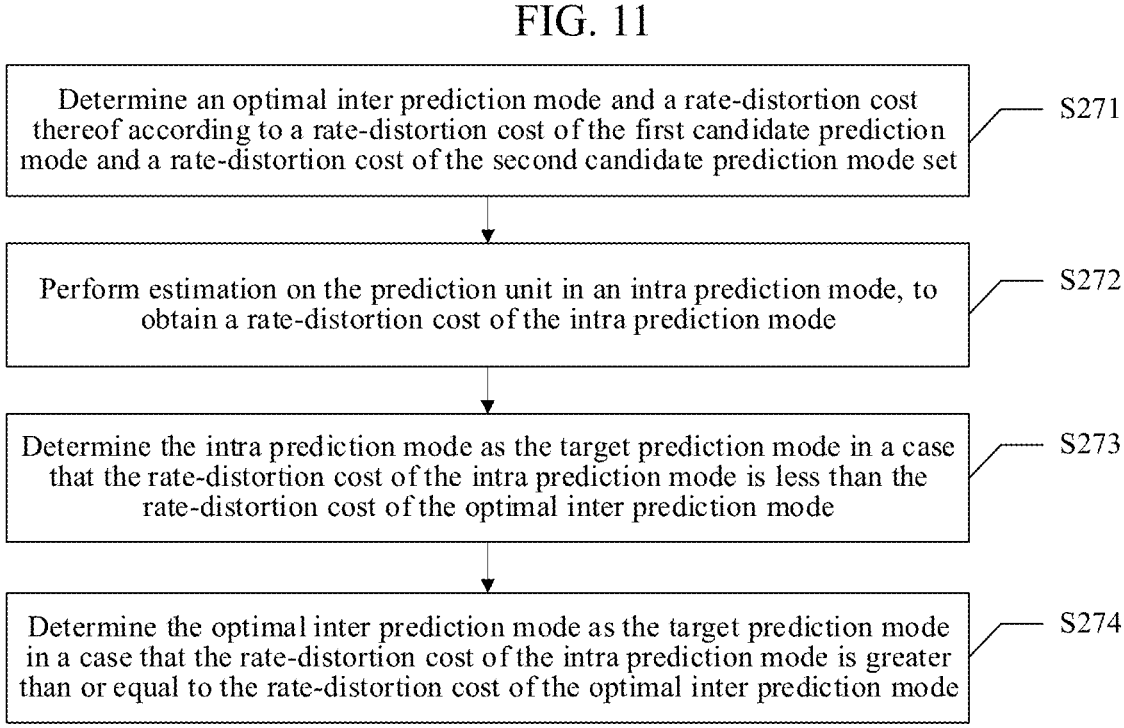
FIG. 12 is a flowchart of operation S270 of FIG. 2 according to an embodiment.

FIG. 12 is a flowchart of operation S270 of FIG. 2 according to an embodiment. As shown in FIG. 12, operation S270 in the embodiment of FIG. 2 may include the following steps.

In operation S271, the system determines an optimal inter prediction mode and a rate-distortion cost thereof according to a rate-distortion cost of the first candidate prediction mode and a rate-distortion cost of the second candidate prediction mode set.

In this embodiment, if the rate-distortion cost of the first candidate prediction mode is less than the rate-distortion cost of the second candidate prediction mode set or the second candidate prediction mode set is empty, the first candidate prediction mode is determined as the optimal inter prediction mode, and the rate-distortion cost of the first candidate prediction mode is the rate-distortion cost of the optimal inter prediction mode. If the rate-distortion cost of the first candidate prediction mode is greater than or equal to the rate-distortion cost of the second candidate prediction mode set, a candidate asymmetric inter prediction mode corresponding to the rate-distortion cost of the second candidate prediction mode set is determined as the target prediction mode, and a rate-distortion cost of the candidate asymmetric inter prediction mode corresponding to the rate-distortion cost of the second candidate prediction mode set is the rate-distortion cost of the target prediction mode.

In operation S272, the system performs estimation on the prediction unit in an intra prediction mode, to obtain a rate-distortion cost of the intra prediction mode.

In operation S273, the system determines the intra prediction mode as the target prediction mode in a case that the rate-distortion cost of the intra prediction mode is less than the rate-distortion cost of the optimal inter prediction mode.

In operation S274, the system determines the optimal inter prediction mode as the target prediction mode in a case that the rate-distortion cost of the intra prediction mode is greater than or equal to the rate-distortion cost of the optimal inter prediction mode.

In an exemplary embodiment, the asymmetric inter prediction modes include a horizontal division mode and a vertical division mode. In this embodiment, during performing of operation S240 in FIG. 2, the following steps may be performed: determining, in a case that the first candidate prediction mode is the first symmetric inter prediction mode, that the second candidate prediction mode set includes the horizontal division mode, determining, in a case that the first candidate prediction mode is a second symmetric inter prediction mode, that the second candidate prediction mode set includes the vertical division mode, or determining the second candidate prediction mode set according to the target coding unit in a case that the first candidate prediction mode is a third symmetric inter prediction mode.

In an exemplary embodiment, the determining the second candidate prediction mode set according to the target coding unit in a case that the first candidate prediction mode is a third symmetric inter prediction mode may include: dividing the target coding unit into a plurality of target subblocks, obtaining a residual indicator of each target subblock, obtaining a horizontal residual indicator and a vertical residual indicator of the target coding unit according to the residual indicator of the each target subblock, obtaining a horizontal division indicator according to the horizontal residual indicator, obtaining a vertical division indicator according to the vertical residual indicator, and determining the second candidate prediction mode set according to the horizontal division indicator and the vertical division indicator.

In an exemplary embodiment, the determining the second candidate prediction mode set according to the horizontal division indicator and the vertical division indicator may include: determining, in a case that the horizontal division indicator is equal to the vertical division indicator, that the second candidate prediction mode set is empty, determining, in a case that the horizontal division indicator is greater than the vertical division indicator, that the candidate asymmetric inter prediction mode includes the horizontal division mode, or determining, in a case that the horizontal division indicator is less than the vertical division indicator, that the candidate asymmetric inter prediction mode includes the vertical division mode.

In this embodiment, an optimal inter prediction mode in an inter prediction mode is first determined, and a rate-distortion cost of the optimal inter prediction mode is compared with that of the intra prediction mode, such that a target prediction mode may be determined according to a result of the comparison.

Figure 13:
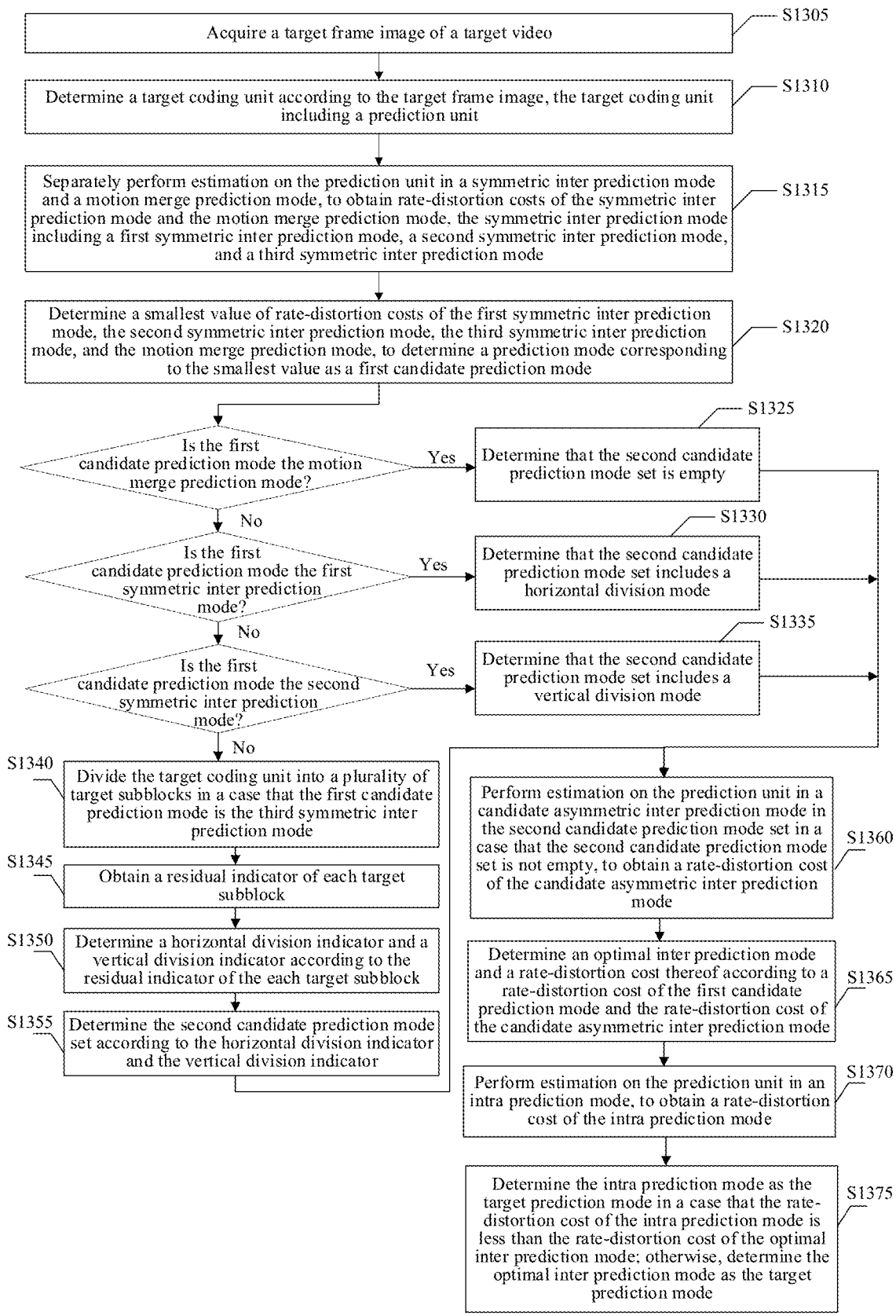
FIG. 13 is a flowchart of a coding mode selection method according to an embodiment.

FIG. 13 is a schematic flowchart of a coding mode selection method according to an embodiment. As shown in FIG. 13, the coding mode selection method in this embodiment of this disclosure may include the following operations.

In operation S1305, the system acquires a target frame image of a target video.

In operation S1310, the system determines a target coding unit according to the target frame image, the target coding unit including a prediction unit.

In operation S1315, the system separately performs estimation on the prediction unit in a symmetric inter prediction mode and a motion merge prediction mode, to obtain rate-distortion costs of the symmetric inter prediction mode and the motion merge prediction mode, the symmetric inter prediction mode including a first symmetric inter prediction mode, a second symmetric inter prediction mode, and a third symmetric inter prediction mode.

In operation S1320, the system determines a smallest value of rate-distortion costs of the first symmetric inter prediction mode, the second symmetric inter prediction mode, the third symmetric inter prediction mode, and the motion merge prediction mode, to determine a prediction mode corresponding to the smallest value as a first candidate prediction mode.

In operation S1325, the system determines, in a case that the first candidate prediction mode is the motion merge prediction mode, that the second candidate prediction mode set is empty.

In operation S1330, the system determines, in a case that the first candidate prediction mode is the first symmetric inter prediction mode, that the second candidate prediction mode set includes a horizontal division mode.

In operation S1335, the system determines, in a case that the first candidate prediction mode is the second symmetric inter prediction mode, that the second candidate prediction mode set includes a vertical division mode.

In operation S1340, the system divides the target coding unit into a plurality of target subblocks in a case that the first candidate prediction mode is the third symmetric inter prediction mode.

In operation S1345, the system obtains a residual indicator of each target subblock.

In operation S1350, the system determines a horizontal division indicator and a vertical division indicator according to the residual indicator of the each target subblock.

In this embodiment, operation S3633 to operation S3635 in FIG. 6 may be performed.

In operation S1355, the system determines the second candidate prediction mode set according to the horizontal division indicator and the vertical division indicator.

In this embodiment of this disclosure, operation S710 to operation S730 in FIG. 7 may be performed.

In operation S1360, the system performs estimation on the prediction unit in a candidate asymmetric inter prediction mode in the second candidate prediction mode set in a case that the second candidate prediction mode set is not empty, to obtain a rate-distortion cost of the second candidate prediction mode set.

In operation S1365, the system determines an optimal inter prediction mode and a rate-distortion cost thereof according to a rate-distortion cost of the first candidate prediction mode and a rate-distortion cost of the candidate asymmetric inter prediction mode.

In operation S1370, the system performs estimation on the prediction unit in an intra prediction mode, to obtain a rate-distortion cost of the intra prediction mode.

In operation S1375, the system determines the intra prediction mode as the target prediction mode in a case that the rate-distortion cost of the intra prediction mode is less than the rate-distortion cost of the optimal inter prediction mode. Otherwise, the system determines the optimal inter prediction mode as the target prediction mode.

Figure 14:
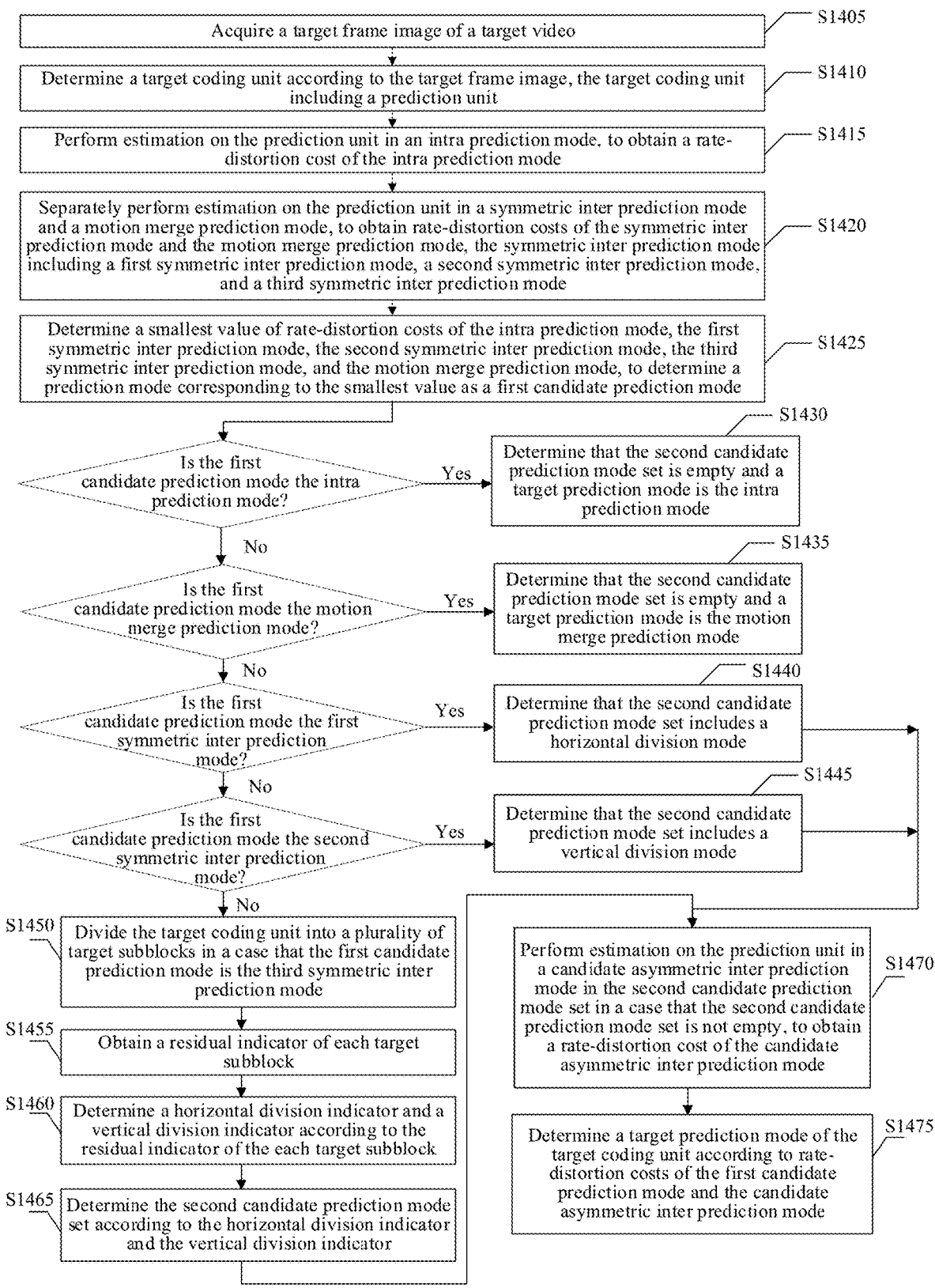
FIG. 14 is a flowchart of a coding mode selection method according to an embodiment.

FIG. 14 is a flowchart of a coding mode selection method according to an embodiment. As shown in FIG. 14, the coding mode selection method in this embodiment may include the following operations.

In operation S1405, the system acquires a target frame image of a target video.

In operation S1410, the system determines a target coding unit according to the target frame image, the target coding unit including a prediction unit.

In operation S1415, the system performs estimation on the prediction unit in an intra prediction mode, to obtain a rate-distortion cost of the intra prediction mode.

In operation S1420, the system separately performs estimation on the prediction unit in a symmetric inter prediction mode and a motion merge prediction mode, to obtain rate-distortion costs of the symmetric inter prediction mode and the motion merge prediction mode, the symmetric inter prediction mode including a first symmetric inter prediction mode, a second symmetric inter prediction mode, and a third symmetric inter prediction mode.

In operation S1425, the system determines a smallest value of rate-distortion costs of the intra prediction mode, the first symmetric inter prediction mode, the second symmetric inter prediction mode, the third symmetric inter prediction mode, and the motion merge prediction mode, to determine a prediction mode corresponding to the smallest value as a first candidate prediction mode.

In operation S1430, the system determines, in a case that the first candidate prediction mode is the intra prediction mode, that the second candidate prediction mode set is empty and a target prediction mode is the intra prediction mode.

In operation S1435, the system determines, in a case that the first candidate prediction mode is the motion merge prediction mode, that the second candidate prediction mode set is empty and a target prediction mode is the motion merge prediction mode.

In operation S1440, the system determines, in a case that the first candidate prediction mode is the first symmetric inter prediction mode, that the second candidate prediction mode set includes a horizontal division mode.

In operation S1445, the system determines, in a case that the first candidate prediction mode is the second symmetric inter prediction mode, that the second candidate prediction mode set includes a vertical division mode.

In operation S1450, the system divides the target coding unit into a plurality of target subblocks in a case that the first candidate prediction mode is the third symmetric inter prediction mode.

In operation S1455, the system obtains a residual indicator of each target subblock.

In operation S1460, the system determines a horizontal division indicator and a vertical division indicator according to the residual indicator of the each target subblock.

In this embodiment, operation S3633 to operation S3635 in FIG. 6 may be performed.

In operation S1465, the system determines the second candidate prediction mode set according to the horizontal division indicator and the vertical division indicator.

In this embodiment, operation S710 to operation S730 in FIG. 7 may be performed.

In operation S1470, the system performs estimation on the prediction unit in a candidate asymmetric inter prediction mode in the second candidate prediction mode set in a case that the second candidate prediction mode set is not empty, to obtain a rate-distortion cost of the second candidate prediction mode set.

In operation S1475, the system determines a target prediction mode of the target coding unit according to rate-distortion costs of the first candidate prediction mode and the second candidate prediction mode set.

In this embodiment, operation S381 and operation S382 in FIG. 8 maybe performed.

Apparatus embodiments of this disclosure are described below, and may be used for performing the foregoing coding mode selection method of this disclosure. For details not disclosed in the apparatus embodiments of this disclosure, reference may be made to the embodiments of the foregoing coding mode selection method of this disclosure.

Figure 16:
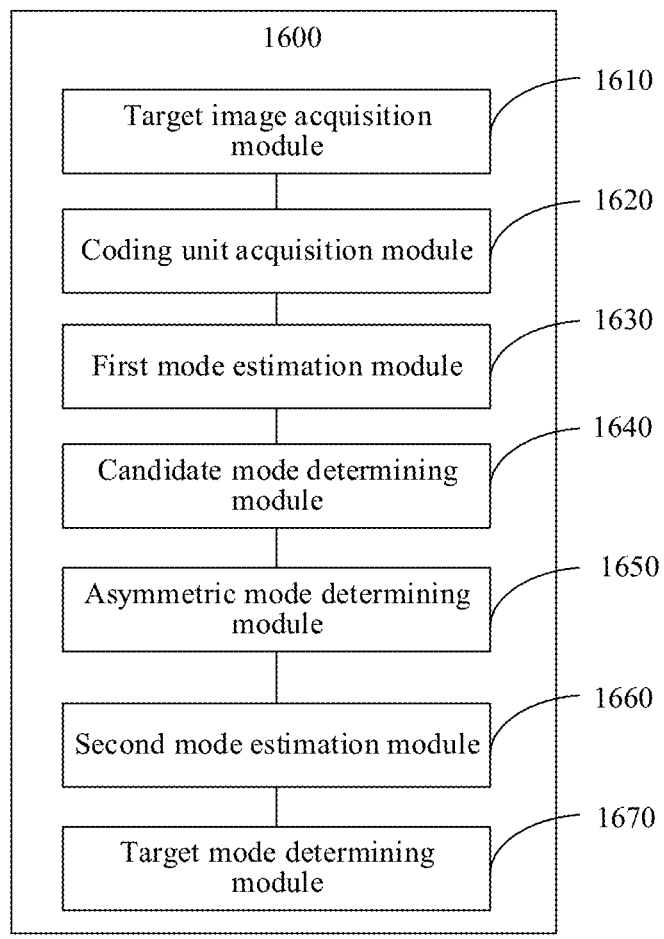
FIG. 16 is a diagram of a coding mode selection apparatus according to an embodiment.

FIG. 16 is a diagram of a coding mode selection apparatus according to an embodiment. Referring to FIG. 16, the coding mode selection apparatus 1600 according to this embodiment of this disclosure may include a target image acquisition module 1610, a coding unit acquisition module 1620, a first mode estimation module 1630, a candidate mode determining module 1640, an asymmetric mode determining module 1650, a second mode estimation module 1660, and a target mode determining module 1670.

The target image acquisition module 1610 may be configured to acquire a target frame image of a target video.

The coding unit acquisition module 1620 may be configured to determine a target coding unit according to the target frame image, the target coding unit including a prediction unit.

The first mode estimation module 1630 may be configured to separately perform estimation on the prediction unit in a symmetric inter prediction mode and a motion merge prediction mode, to obtain rate-distortion costs of the symmetric inter prediction mode and the motion merge prediction mode.

The candidate mode determining module 1640 may be configured to determine a first candidate prediction mode according to the rate-distortion costs of the symmetric inter prediction mode and the motion merge prediction mode.

In an exemplary embodiment, the symmetric inter prediction mode includes a first symmetric inter prediction mode, a second symmetric inter prediction mode, and a third symmetric inter prediction mode. The candidate mode determining module 1640 may include a candidate mode first determining unit, a candidate mode second determining unit, a candidate mode third determining unit, and a candidate mode fourth determining unit. The candidate mode first determining unit may be configured to determine the motion merge prediction mode as the first candidate prediction mode in a case that a rate-distortion cost of the motion merge prediction mode is less than a rate-distortion cost of the symmetric inter prediction mode. The candidate mode second determining unit may be configured to determine the first symmetric inter prediction mode as the first candidate prediction mode in a case that a rate-distortion cost of the first symmetric inter prediction mode is less than each of rate-distortion costs of the second symmetric inter prediction mode, the third symmetric inter prediction mode, and the motion merge prediction mode. The candidate mode third determining unit may be configured to determine the second symmetric inter prediction mode as the first candidate prediction mode in a case that a rate-distortion cost of the second symmetric inter prediction mode is less than each of rate-distortion costs of the first symmetric inter prediction mode, the third symmetric inter prediction mode, and the motion merge prediction mode. The candidate mode fourth determining unit may be configured to determine the third symmetric inter prediction mode as the first candidate prediction mode in a case that a rate-distortion cost of the third symmetric inter prediction mode is less than each of rate-distortion costs of the first symmetric inter prediction mode, the second symmetric inter prediction mode, and the motion merge prediction mode.

The asymmetric mode determining module 1650 may be configured to determine a second candidate prediction mode set in asymmetric inter prediction modes according to the first candidate prediction mode.

The second mode estimation module 1660 may be configured to perform estimation on the prediction unit in a candidate asymmetric inter prediction mode in the second candidate prediction mode set in a case that the second candidate prediction mode set is not empty, to obtain a rate-distortion cost of the second candidate prediction mode set.

The target mode determining module 1670 may be configured to determine a target prediction mode of the target coding unit according to rate-distortion costs of the first candidate prediction mode and the second candidate prediction mode set.

In an exemplary embodiment, the target mode determining module 1670 may include an optimal inter-frame mode determining unit, an intra-frame mode estimation unit, a target mode first determining unit, and a target mode second determining unit. The optimal inter-frame mode determining unit may be configured to determine an optimal inter prediction mode and a rate-distortion cost thereof according to a rate-distortion cost of the first candidate prediction mode and a rate-distortion cost of the candidate asymmetric inter prediction mode. The intra-frame mode estimation unit may be configured to perform estimation on the prediction unit in an intra prediction mode, to obtain a rate-distortion cost of the intra prediction mode. The target mode first determining unit may be configured to determine the intra prediction mode as the target prediction mode in a case that the rate-distortion cost of the intra prediction mode is less than the rate-distortion cost of the optimal inter prediction mode. The target mode second determining unit may be configured to determine the optimal inter prediction mode as the target prediction mode in a case that the rate-distortion cost of the intra prediction mode is greater than or equal to the rate-distortion cost of the optimal inter prediction mode.

According to the coding mode selection apparatus provided in this implementation of this disclosure, a prediction unit of a target coding unit is used as an object to obtain rate-distortion costs of an estimation symmetric inter prediction mode and a motion merge prediction mode. In this way, a first candidate prediction mode may be determined according to rate-distortion costs of the symmetric inter prediction mode and the motion merge prediction mode, and then a second candidate prediction mode set may be determined in asymmetric inter prediction modes by using the first candidate prediction mode as a guide. In addition, estimation is performed on the prediction unit in a candidate asymmetric inter prediction mode in the second candidate prediction mode set when the second candidate prediction mode set is not empty, so that a target prediction mode of the target coding unit may be determined by using a rate-distortion cost of the obtained candidate asymmetric inter prediction mode and a rate-distortion cost of the first candidate prediction mode as a guide. In summary, during determining of the target prediction mode, division of the asymmetric inter prediction modes may be guided according to the first candidate prediction mode, to obtain the second candidate prediction mode set, and only the asymmetric inter prediction mode in the second candidate prediction mode set is estimated, so that an amount of calculation data may be effectively reduced, thereby increasing a coding speed and optimizing a coding process while ensuring quality.

Figure 17:
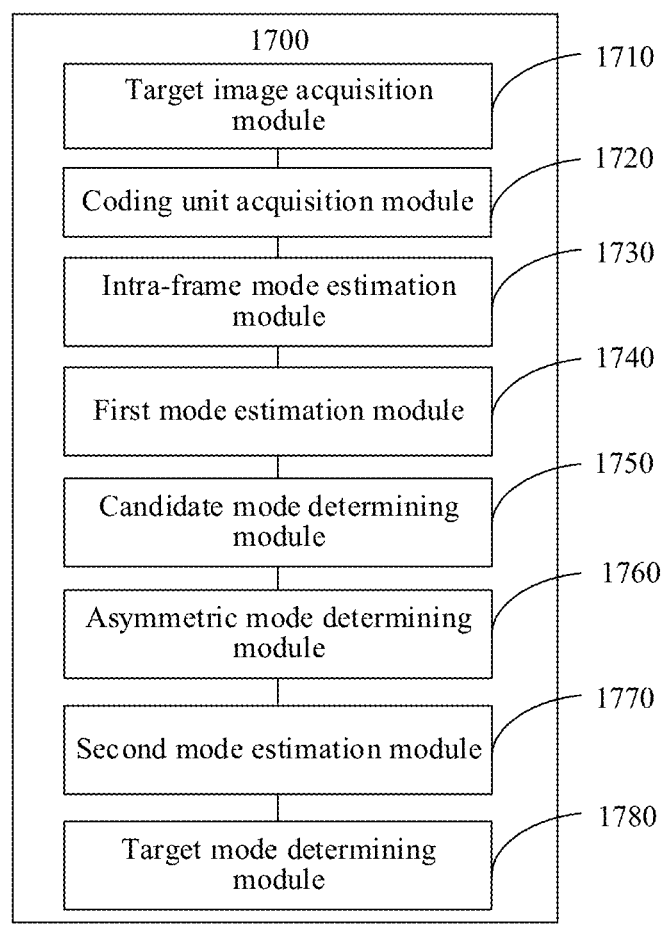
FIG. 17 is a diagram of a coding mode selection apparatus according to an embodiment.

FIG. 17 is a diagram of a coding mode selection apparatus according to an embodiment. Referring to FIG. 17, the coding mode selection apparatus 1700 of this embodiment of this disclosure may include a target image acquisition module 1710, a coding unit acquisition module 1720, an intra-frame mode estimation module 1730, a first mode estimation module 1740, a candidate mode determining module 1750, an asymmetric mode determining module 1760, a second mode estimation module 1770, and a target mode determining module 1780.

The target image acquisition module 1710 may be configured to acquire a target frame image of a target video.

The coding unit acquisition module 1720 may be configured to determine a target coding unit according to the target frame image, the target coding unit including a prediction unit.

The intra-frame mode estimation module 1730 may be configured to perform estimation on the prediction unit in an intra prediction mode, to obtain a rate-distortion cost of the intra prediction mode.

The first mode estimation module 1740 may be configured to separately perform estimation on the prediction unit in a symmetric inter prediction mode and a motion merge prediction mode, to obtain rate-distortion costs of the symmetric inter prediction mode and the motion merge prediction mode.

The candidate mode determining module 1750 may be configured to determine a first candidate prediction mode according to the rate-distortion costs of the symmetric inter prediction mode and the motion merge prediction mode.

In an exemplary embodiment, the symmetric inter prediction mode may include a first symmetric inter prediction mode, a second symmetric inter prediction mode, and a third symmetric inter prediction mode. The candidate mode determining module 1750 may include a candidate mode first determining unit, a candidate mode second determining unit, and a candidate mode third determining unit. The candidate mode first determining unit may be configured to determine the first symmetric inter prediction mode as the first candidate prediction mode if a rate-distortion cost of the first symmetric inter prediction mode is less than each of rate-distortion costs of the second symmetric inter prediction mode, the third symmetric inter prediction mode, the motion merge prediction mode, and the intra prediction mode. The candidate mode second determining unit may be configured to determine the second symmetric inter prediction mode as the first candidate prediction mode if a rate-distortion cost of the second symmetric inter prediction mode is less than each of rate-distortion costs of the first symmetric inter prediction mode, the third symmetric inter prediction mode, the motion merge prediction mode, and the intra prediction mode. The candidate mode third determining unit may be configured to determine the third symmetric inter prediction mode as the first candidate prediction mode if a rate-distortion cost of the third symmetric inter prediction mode is less than each of rate-distortion costs of the first symmetric inter prediction mode, the second symmetric inter prediction mode, the motion merge prediction mode, and the intra prediction mode.

In an exemplary embodiment, the candidate mode determining module 1750 may include a candidate mode fourth determining unit and a candidate mode fifth determining unit. The candidate mode fourth determining unit may be configured to determine the intra prediction mode as the first candidate prediction mode if a rate-distortion cost of the intra prediction mode is less than each of the rate-distortion costs of the symmetric inter prediction mode and the motion merge prediction mode. The candidate mode fifth determining unit may be configured to determine the motion merge prediction mode as the first candidate prediction mode if a rate-distortion cost of the motion merge prediction mode is less than each of rate-distortion costs of the intra prediction mode and the symmetric inter prediction mode.

The asymmetric mode determining module 1760 may be configured to determine a second candidate prediction mode set in asymmetric inter prediction modes according to the first candidate prediction mode.

In an exemplary embodiment, the asymmetric inter prediction modes include a horizontal division mode and a vertical division mode. The asymmetric mode determining module 1760 may include an asymmetric mode first determining unit, an asymmetric mode second determining unit, and an asymmetric mode third determining unit. The asymmetric mode first determining unit may be configured to determine, in a case that the first candidate prediction mode is a first symmetric inter prediction mode, that the second candidate prediction mode set includes the horizontal division mode. The asymmetric mode second determining unit may be configured to determine, in a case that the first candidate prediction mode is a second symmetric inter prediction mode, that the second candidate prediction mode set includes the vertical division mode. The asymmetric mode third determining unit may be configured to determine the second candidate prediction mode set according to the target coding unit in a case that the first candidate prediction mode is a third symmetric inter prediction mode.

In an exemplary embodiment, the asymmetric mode third determining unit may include a coding subunit division subunit, a residual indicator calculation subunit, a residual indicator division subunit, a horizontal division indicator calculation subunit, a vertical division indicator calculation subunit, and an asymmetric mode third determining subunit. The coding subunit division subunit may be configured to divide the target coding unit into a plurality of target subblocks. The residual indicator calculation subunit may be configured to obtain a residual indicator of each target subblock. The residual indicator division subunit may be configured to obtain a horizontal residual indicator and a vertical residual indicator of the target coding unit according to the residual indicator of the each target subblock. The horizontal division indicator calculation subunit may be configured to obtain a horizontal division indicator according to the horizontal residual indicator. The vertical division indicator calculation subunit may be configured to obtain a vertical division indicator according to the vertical residual indicator. The asymmetric mode third determining subunit may be configured to determine the second candidate prediction mode set according to the horizontal division indicator and the vertical division indicator.

In an exemplary embodiment, the asymmetric mode third determining subunit may include a first indicator judgment subunit, a second indicator judgment subunit, and a third indicator judgment subunit. The first indicator judgment subunit may be configured to determine, in a case that the horizontal division indicator is equal to the vertical division indicator, that the second candidate prediction mode set is empty. The second indicator judgment subunit may be configured to determine, in a case that the horizontal division indicator is greater than the vertical division indicator, that the candidate asymmetric inter prediction mode includes the horizontal division mode. The third indicator judgment subunit may be configured to determine, in a case that the horizontal division indicator is less than the vertical division indicator, that the candidate asymmetric inter prediction mode includes the vertical division mode.

The second mode estimation module 1770 may be configured to perform estimation on the prediction unit in a candidate asymmetric inter prediction mode in the second candidate prediction mode set in a case that the second candidate prediction mode set is not empty, to obtain a rate-distortion cost of the second candidate prediction mode set.

The target mode determining module 1780 may be configured to determine a target prediction mode of the target coding unit according to rate-distortion costs of the first candidate prediction mode and the second candidate prediction mode set.

In an exemplary embodiment, the target mode determining module 1780 may include a target mode first determining unit and a target mode second determining unit. The target mode first determining unit may be configured to determine the first candidate prediction mode as the target prediction mode in a case that a rate-distortion cost of the first candidate prediction mode is less than a rate-distortion cost of the candidate asymmetric inter prediction mode or the second candidate prediction mode set is empty. The target mode second determining unit may be configured to determine the candidate asymmetric inter prediction mode as the target prediction mode in a case that a rate-distortion cost of the first candidate prediction mode is greater than a rate-distortion cost of the candidate asymmetric inter prediction mode.

In an exemplary embodiment, the target mode determining module 1780 may include a target mode third determining unit and a target mode fourth determining unit. The target mode third determining unit may be configured to determine the intra prediction mode as the target prediction mode in a case that the first candidate prediction mode is the intra prediction mode. The target mode fourth determining unit may be configured to determine the motion merge prediction mode as the target prediction mode in a case that the first candidate prediction mode is the motion merge prediction mode.

According to the coding mode selection apparatus provided in this implementation of this disclosure, a prediction unit of a target coding unit is used as an object to obtain rate-distortion costs of an estimation intra prediction mode, a symmetric inter prediction mode, and a motion merge prediction mode. In this way, a first candidate prediction mode may be determined according to the rate-distortion costs of the intra prediction mode, the symmetric inter prediction mode, and the motion merge prediction mode, and then a second candidate prediction mode set may be determined in asymmetric inter prediction modes by using the first candidate prediction mode as a guide. In addition, estimation is performed on the prediction unit in a candidate asymmetric inter prediction mode in the second candidate prediction mode set when the second candidate prediction mode set is not empty, so that a target prediction mode of the target coding unit may be determined by using a rate-distortion cost of the obtained candidate asymmetric inter prediction mode and a rate-distortion cost of the first candidate prediction mode as a guide. In summary, during determining of the target prediction mode, division of the asymmetric inter prediction modes may be guided according to the first candidate prediction mode, to obtain the second candidate prediction mode set, and only the asymmetric inter prediction mode in the second candidate prediction mode set is estimated, so that an amount of calculation data may be effectively reduced, thereby increasing a coding speed and optimizing a coding process while ensuring quality.

Figure 18:
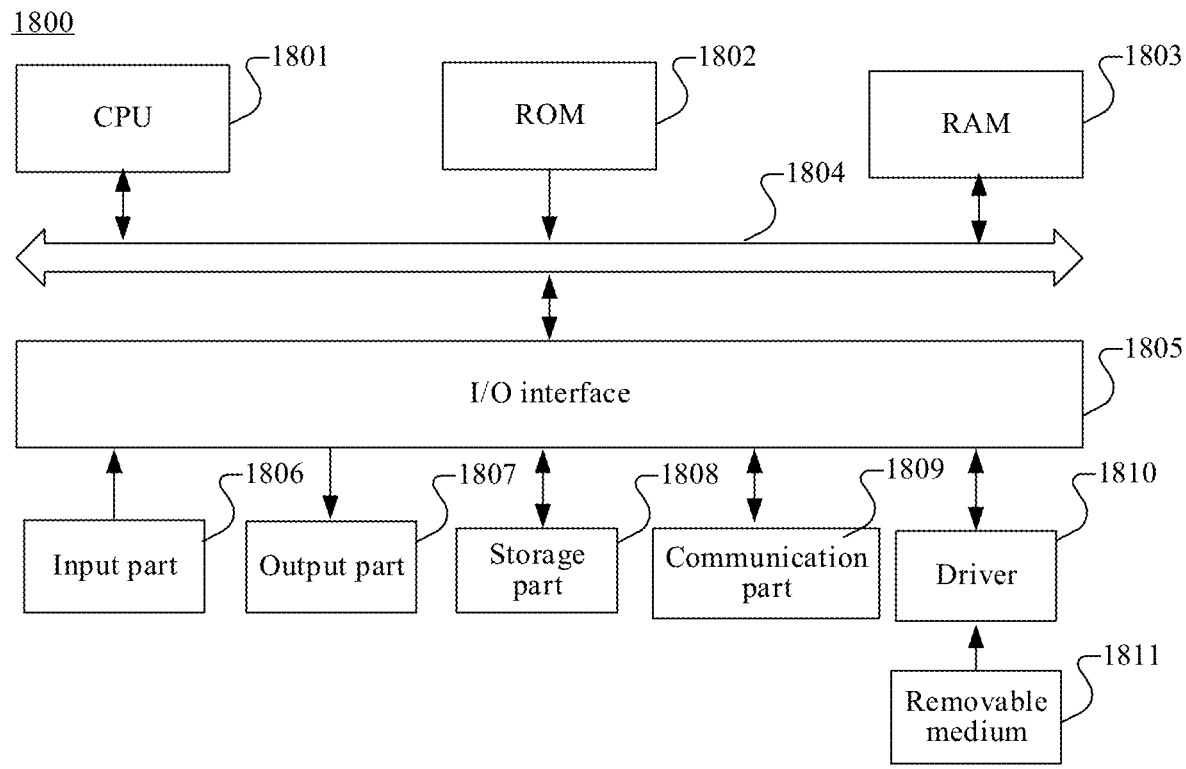
FIG. 18 is a structural diagram of a computer system of an electronic device according to an embodiment.

FIG. 18 is a diagram of a computer system of an electronic device according to an embodiment. It should be noted that, the computer system 1800 of the electronic device shown in FIG. 18 is merely an example, and does not constitute any limitation on functions and use ranges of the embodiments of this disclosure.

As shown in FIG. 18, the computer system 1800 includes a central processing unit (CPU) 1801. The CPU 1801 may perform various appropriate actions and processing according to a program stored in a read-only memory (ROM) 1802 or a program loaded from a storage portion 1808 into a random access memory (RAM) 1803. The RAM 1803 further stores various programs and data required for system operations. The CPU 1801, the ROM 1802, and the RAM 1803 are connected to each other through a bus 1804. An input/output (I/O) interface 1805 is also connected to the bus 1804.

The following components are connected to the I/O interface 1805 includes an input part 1806 including a keyboard, a mouse, or the like, an output part 1807 including a cathode ray tube (CRT), a liquid crystal display (LCD), a speaker, or the like, a storage part 1808 including hard disk, or the like, and a communication part 1809 including a network interface card such as an local area network (LAN) card, a modem, or the like. The communication portion 1809 performs communication processing by using a network such as the Internet. A driver 1810 is also connected to the I/O interface 1805 as required. A removable medium 1811, such as a magnetic disk, an optical disc, a magneto-optical disk, or a semiconductor memory, is installed on the driver 1810 as required, so that a computer program read from the removable medium is installed into the storage part 1808 as required.

The processes described in the following by referring to the flowcharts may be implemented as computer software programs. For example, an embodiment of this disclosure includes a computer program product. The computer program product includes a computer program hosted on a computer-readable medium. The computer program includes program code for performing the method shown in the flowchart. In such an embodiment, the computer program may be downloaded and installed from the network through the communication portion 1809, and/or installed from the removable medium 1811. When the computer program is executed by the CPU 1801, the various functions defined in the system of this disclosure are executed.

It should be noted that, the computer-readable medium of the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. An example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM) or a flash memory, an optical fiber, a compact disk read-only memory (CD-ROM), an optical storage device, a magnetic storage device, or any appropriate combination thereof. In the embodiments of this disclosure, the computer-readable storage medium may be any tangible medium including or storing a program, and the program may be used by or in combination with an instruction execution system, apparatus or component. In the embodiments of this disclosure, the computer-readable signal medium may include a data signal propagated in a baseband or as a part of a carrier, and stores computer-readable program code. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code contained in the computer readable medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related modules and/or units and/or subunits in the embodiments of this disclosure may be implemented in a software manner, or may be implemented in a hardware manner, and the described modules and/or units and/or subunits may alternatively be set in a processor. Names of the modules and/or units and/or subunits do not constitute a limitation on the modules and/or units and/or subunits in a specific case.

The embodiments of this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the following embodiment. For example, the electronic device may implement steps shown in FIG. 2, FIG. 3, FIG. 4, FIG. 5, FIG. 6, FIG. 7, FIG. 8, FIG. 9, FIG. 10, FIG. 11, FIG. 12, FIG. 13, or FIG. 14.

Although several modules, units, or subunits of a device for action execution are mentioned in the foregoing detailed descriptions, the division is not mandatory. In fact, according to the embodiments of this disclosure, features and functions of two or more modules or units or subunits described above may be specified in one module or unit or subunit. On the contrary, the features and functions of one module or unit described above may be divided to be specified by a plurality of modules, units, or subunits.

Through descriptions of the foregoing implementations, it is easy for a person skilled in the art to understand that the exemplary implementations described herein may be implemented by software or by combining software with necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A coding mode selection method, performed by at least one processor, the method comprising:
   acquiring a target frame image of a target video;
   determining a target coding unit based on the target frame image, the target coding unit comprising a prediction unit;
   obtaining a rate-distortion cost of a symmetric inter prediction mode and obtaining a rate-distortion cost of a motion merge prediction mode by separately performing estimation on the prediction unit in the symmetric inter prediction mode and estimation on the prediction unit in the motion merge prediction mode;
   determining a first candidate prediction mode based on the rate-distortion costs of the symmetric inter prediction mode and the motion merge prediction mode;
   determining a second candidate prediction mode set in asymmetric inter prediction modes based on the first candidate prediction mode, wherein the asymmetric inter prediction modes comprise a horizontal division mode and a vertical division mode;
   obtaining a rate-distortion cost of the second candidate prediction mode set by performing estimation on the prediction unit in a first candidate asymmetric inter prediction mode in the second candidate prediction mode set based on the second candidate prediction mode set being not empty; and
   determining a target prediction mode of the target coding unit based on rate-distortion costs of the first candidate prediction mode and the second candidate prediction mode set,
   wherein the determining the second candidate prediction mode set comprises:
   determining that the first candidate prediction mode is a symmetric inter prediction mode in which the prediction unit is not split;
   dividing the target coding unit into a plurality of target subblocks;
   obtaining respective residual indicators of the plurality of target subblocks;
   determining, based on the respective residual indicators of the plurality of target subblocks, a first probability of the horizontal division mode and a second probability of the vertical division mode; and
   determining the second candidate prediction mode set as the horizontal division mode or the vertical division mode, based on the first probability and the second probability.

2. The method of claim 1, wherein, before the separately performing estimation on the prediction unit in the symmetric inter prediction mode and the motion merge prediction mode, the method further comprises:
   obtaining a rate-distortion cost of an intra prediction mode by performing estimation on the prediction unit in the intra prediction mode.

3. The method of claim 2, wherein the symmetric inter prediction mode comprises a first symmetric inter prediction mode, a second symmetric inter prediction mode, and a third symmetric inter prediction mode; and
   wherein the determining the first candidate prediction mode based on the rate-distortion costs of the symmetric inter prediction mode and the motion merge prediction mode comprises:
   using, as the first candidate prediction mode, an object having a smallest rate-distortion cost among the intra prediction mode, the first symmetric inter prediction mode, the second symmetric inter prediction mode, and the third symmetric inter prediction mode.

4. The method of claim 2, wherein the determining the first candidate prediction mode based on the rate-distortion costs of the symmetric inter prediction mode and the motion merge prediction mode comprises:
   determining the intra prediction mode as the first candidate prediction mode based on the rate-distortion cost of the intra prediction mode being less than each of the rate-distortion costs of the symmetric inter prediction mode and the motion merge prediction mode; or
   determining the motion merge prediction mode as the first candidate prediction mode based on the rate-distortion cost of the motion merge prediction mode being less than the rate-distortion costs of each of the intra prediction mode and the symmetric inter prediction mode.

5. The method of claim 4, wherein the determining the target prediction mode of the target coding unit based on the rate-distortion costs of the first candidate prediction mode and the second candidate prediction mode set comprises:
   determining the intra prediction mode as the target prediction mode based on the first candidate prediction mode being the intra prediction mode; or determining the motion merge prediction mode as the target prediction mode based on the first candidate prediction mode being the motion merge prediction mode.

6. The method of claim 1, wherein the determining the second candidate prediction mode set as the horizontal division mode or the vertical division mode, based on the first probability and the second probability comprises:
obtaining a horizontal division indicator, corresponding to the first probability, based on the respective residual indicators of the plurality of target subblocks;
obtaining a vertical division indicator, corresponding to the second probability, based on the respective residual indicators of the plurality of target subblocks; and
determining the second candidate prediction mode set based on the horizontal division indicator and the vertical division indicator.

7. The method of claim 6, wherein the determining the second candidate prediction mode set based on the horizontal division indicator and the vertical division indicator comprises:
determining, based on the horizontal division indicator being equal to the vertical division indicator, that the second candidate prediction mode set is empty;
determining, based on the horizontal division indicator being greater than the vertical division indicator, that the second candidate prediction mode set comprises the horizontal division mode; or
determining, based on the horizontal division indicator being less than the vertical division indicator, that the second candidate prediction mode set comprises the vertical division mode.

8. The method of claim 1, wherein the determining the target prediction mode of the target coding unit based on the rate-distortion costs of the first candidate prediction mode and the second candidate prediction mode set comprises:
determining the first candidate prediction mode as the target prediction mode based on the rate-distortion cost of the first candidate prediction mode is less than the rate-distortion cost of the second candidate prediction mode set or the second candidate prediction mode set is empty; or
determining a second candidate asymmetric inter prediction mode corresponding to the rate-distortion cost of the second candidate prediction mode set as the target prediction mode based on the rate-distortion cost of the first candidate prediction mode being greater than or equal to the rate-distortion cost of the second candidate prediction mode set.

9. The method of claim 1, wherein the symmetric inter prediction mode comprises a first symmetric inter prediction mode, a second symmetric inter prediction mode, and a third symmetric inter prediction mode; and
wherein the determining the first candidate prediction mode based on the rate-distortion costs of the symmetric inter prediction mode and the motion merge prediction mode comprises:
using, as the first candidate prediction mode, an object having a smallest rate-distortion cost among the motion merge prediction mode, the first symmetric inter prediction mode, the second symmetric inter prediction mode, and the third symmetric inter prediction mode.

10. The method of claim 9, wherein the determining the target prediction mode of the target coding unit based on the rate-distortion costs of the first candidate prediction mode and the second candidate prediction mode set comprises:

determining an optimal inter prediction mode and a rate-distortion cost of the optimal inter prediction mode based on the rate-distortion costs of the first candidate prediction mode and the second candidate prediction mode set;
obtaining the rate-distortion cost of an intra prediction mode by performing estimation on the prediction unit in the intra prediction mode; and
determining the intra prediction mode as the target prediction mode based on the rate-distortion cost of the intra prediction mode being less than the rate-distortion cost of the optimal inter prediction mode.

11. An apparatus, comprising:
at least one memory configured to store computer program code; and
at least one processor configured to access said computer program code and operate as instructed by said computer program code, said computer program code comprising:
first acquiring code configured to cause the at least one processor to acquire a target frame image of a target video;
first determining code configured to cause the at least one processor to determine a target coding unit based on the target frame image, the target coding unit comprising a prediction unit;
first obtaining code configured to cause the at least one processor to obtain a rate-distortion cost of a symmetric inter prediction mode and obtain a rate-distortion cost of a motion merge prediction mode by separately performing estimation on the prediction unit in the symmetric inter prediction mode and estimation on the prediction unit in the motion merge prediction mode;
second determining code configured to cause the at least one processor to determine a first candidate prediction mode based on the rate-distortion costs of the symmetric inter prediction mode and the motion merge prediction mode;
third determining code configured to cause the at least one processor to determine a second candidate prediction mode set in asymmetric inter prediction modes based on the first candidate prediction mode, wherein the asymmetric inter prediction modes comprise a horizontal division mode and a vertical division mode;
second obtaining code configured to cause the at least one processor to obtain a rate-distortion cost of the second candidate prediction mode set by performing estimation on the prediction unit in a first candidate asymmetric inter prediction mode in the second candidate prediction mode set based on the second candidate prediction mode set being not empty; and
fourth determining code configured to cause the at least one processor to determining a target prediction mode of the target coding unit based on rate-distortion costs of the first candidate prediction mode and the second candidate prediction mode set,
wherein the third determining code is further configured to cause the at least one processor to, based on determining that the first candidate prediction mode is a symmetric inter prediction mode in which the prediction unit is not split:
divide the target coding unit into a plurality of target subblocks;
obtain respective residual indicators of the plurality of target subblocks;
determine, based on the respective residual indicators of the plurality of target subblocks, a first probability of the horizontal division mode and a second probability of the vertical division mode; and
determine the second candidate prediction mode set as the horizontal division mode or the vertical division mode, based on the first probability and the second probability.

12. The apparatus of claim 11, wherein the computer program code further comprises, for execution prior to the first obtaining code:
third obtaining code configured to cause the at least one processor to obtain a rate-distortion cost of an intra prediction mode by performing estimation on the prediction unit in the intra prediction mode.

13. The apparatus of claim 12, wherein the symmetric inter prediction mode comprises a first symmetric inter prediction mode, a second symmetric inter prediction mode, and a third symmetric inter prediction mode, and
wherein the second determining code is further configured to cause the at least one processor to use, as the first candidate prediction mode, an object having a smallest rate-distortion cost among the intra prediction mode, the first symmetric inter prediction mode, the second symmetric inter prediction mode, and the third symmetric inter prediction mode.

14. The apparatus of claim 12, wherein the second determining code is further configured to cause the at least one processor to:
determine the intra prediction mode as the first candidate prediction mode based on the rate-distortion cost of the intra prediction mode being less than each of the rate-distortion costs of the symmetric inter prediction mode and the motion merge prediction mode; or
determine the motion merge prediction mode as the first candidate prediction mode based on the rate-distortion cost of the motion merge prediction mode being less than the rate-distortion costs of each of the intra prediction mode and the symmetric inter prediction mode.

15. The apparatus of claim 14, wherein the fourth determining code further configured to cause the at least one processor to:
determine the intra prediction mode as the target prediction mode based on the first candidate prediction mode being the intra prediction mode; or
determine the motion merge prediction mode as the target prediction mode based on the first candidate prediction mode being the motion merge prediction mode.

16. The apparatus of claim 11,
wherein the third determining code is further configured to cause the at least one processor to:
determine, based on the first candidate prediction mode being a first symmetric inter prediction mode, that the second candidate prediction mode set comprises the horizontal division mode; or
determine, based on the first candidate prediction mode being a second symmetric inter prediction mode, that the second candidate prediction mode set comprises the vertical division mode.

17. The apparatus of claim 11, wherein the third determining code is further configured to cause the at least one processor to:
obtain a horizontal division indicator corresponding to the first probability, based on the respective residual indicators of the plurality of target subblocks;
obtain a vertical division indicator corresponding to the second probability, based on the respective residual indicators of the plurality of target subblocks; and
determine the second candidate prediction mode set based on the horizontal division indicator and the vertical division indicator.

18. The apparatus of claim 17, wherein the third determining code is further configured to cause the at least one processor to:
determine, based on the horizontal division indicator being equal to the vertical division indicator, that the second candidate prediction mode set is empty;
determine, based on the horizontal division indicator being greater than the vertical division indicator, that the second candidate prediction mode set comprises the horizontal division mode; or
determine, based on the horizontal division indicator being less than the vertical division indicator, that the second candidate prediction mode set comprises the vertical division mode.

19. A non-transitory computer-readable storage medium storing computer instructions that, when executed by at least one processor of a device, cause the at least one processor to:
acquire a target frame image of a target video;
determine a target coding unit based on the target frame image, the target coding unit comprising a prediction unit;
obtain a rate-distortion cost of a symmetric inter prediction mode and obtain a rate-distortion cost of a motion merge prediction mode by separately performing estimation on the prediction unit in the symmetric inter prediction mode and estimation on the prediction unit in the motion merge prediction mode;
determine a first candidate prediction mode based on the rate-distortion costs of the symmetric inter prediction mode and the motion merge prediction mode;
determine a second candidate prediction mode set in asymmetric inter prediction modes based on the first candidate prediction mode, wherein the asymmetric inter prediction modes comprise a horizontal division mode and a vertical division mode;
obtain a rate-distortion cost of the second candidate prediction mode set by performing estimation on the prediction unit in a first candidate asymmetric inter prediction mode in the second candidate prediction mode set based on the second candidate prediction mode set being not empty; and
determine a target prediction mode of the target coding unit based on rate-distortion costs of the first candidate prediction mode and the second candidate prediction mode set,
wherein determining the second candidate prediction mode set comprises, based on determining that the first candidate prediction mode is a symmetric inter prediction mode in which the prediction unit is not split:
dividing the target coding unit into a plurality of target subblocks;
obtaining respective residual indicators of the plurality of target subblocks;
determining, based on the respective residual indicators of the plurality of target subblocks, a first probability of the horizontal division mode and a second probability of the vertical division mode; and
determining the second candidate prediction mode set as the horizontal division mode or the vertical division mode, based on the first probability and the second probability.

* * * * *